(12) United States Patent
Lin et al.

(10) Patent No.: US 10,005,099 B2
(45) Date of Patent: *Jun. 26, 2018

(54) PRODUCTION OF HIGHLY ORIENTED GRAPHENE OXIDE FILMS AND GRAPHITIC FILMS DERIVED THEREFROM

(71) Applicant: Nanotek Instruments, Inc., Dayton, OH (US)

(72) Inventors: Yi-jun Lin, Taoyuan (TW); Shaio-yen Lee, New Taipei (TW); Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/756,006

(22) Filed: Jul. 20, 2015

(65) Prior Publication Data

US 2017/0021387 A1 Jan. 26, 2017

(51) Int. Cl.
*B05D 1/28* (2006.01)
*B05D 1/40* (2006.01)
(Continued)

(52) U.S. Cl.
CPC .............. *B05D 1/28* (2013.01); *B05D 1/40* (2013.01); *B05D 3/007* (2013.01); *B05D 3/12* (2013.01); *C01B 32/184* (2017.08); *C01B 32/20* (2017.08); *C01B 32/23* (2017.08); *B82Y 30/00* (2013.01); *B82Y 40/00* (2013.01)

(58) Field of Classification Search
CPC . B05D 1/28; B05D 1/40; B05D 3/007; B05D 3/02; C01B 31/043; C01B 31/0446
See application file for complete search history.

(56) References Cited

U.S. PATENT DOCUMENTS 4,379,730 A * 4/1983 Anderson ............ D06N 7/0073
118/210
7,071,258 B1 7/2006 Jang et al.
(Continued)

FOREIGN PATENT DOCUMENTS

WO 2015089272 6/2015

OTHER PUBLICATIONS

U.S. Appl. No. 10/858,814, filed Jun. 2004, B. Z. Jang, et al.
(Continued)

*Primary Examiner* — Nathan H Empie

(57) ABSTRACT

A process for producing a highly oriented graphene oxide (GO) film, comprising: (a) preparing either a GO dispersion having GO sheets dispersed in a fluid medium or a GO gel having GO molecules dissolved in a fluid medium; (b) dispensing the GO dispersion or gel onto a surface of an application roller rotating in a first direction to form an applicator layer of GO and transferring the applicator layer to a surface of a supporting film driven in a second direction opposite to the first direction to form a wet layer of GO on the supporting film; and (c) removing said fluid medium from the wet layer of GO to form a dried layer of GO having an inter-planar spacing $d_{002}$ of 0.4 nm to 1.2 nm and an oxygen content no less than 5% by weight. This dried GO layer may be heat-treated to produce a graphitic film.

33 Claims, 26 Drawing Sheets

(51) Int. Cl.
*B05D 3/00* (2006.01)
*B05D 3/12* (2006.01)
*C01B 32/20* (2017.01)
*C01B 32/23* (2017.01)
*C01B 32/184* (2017.01)
*B82Y 30/00* (2011.01)
*B82Y 40/00* (2011.01)

(56) References Cited

U.S. PATENT DOCUMENTS

| | | | | |
|---|---|---|---|---|
| 8,927,065 | B2* | 1/2015 | Zhamu | C01B 31/04 427/372.2 |
| 9,156,700 | B2* | 10/2015 | Zhamu | C01B 31/0469 |
| 9,193,132 | B2* | 11/2015 | Zhamu | B32B 9/04 |
| 2005/0271574 | A1 | 12/2005 | Jang et al. | |
| 2008/0024875 | A1 | 1/2008 | Kawakami et al. | |
| 2008/0048152 | A1 | 2/2008 | Jang et al. | |
| 2010/0085713 | A1 | 4/2010 | Balandin et al. | |
| 2010/0140792 | A1 | 6/2010 | Haddon et al. | |
| 2011/0108978 | A1 | 5/2011 | Kim et al. | |
| 2012/0148732 | A1* | 6/2012 | Hasegawa | H01M 8/0234 427/115 |
| 2013/0236715 | A1 | 9/2013 | Zhamu et al. | |
| 2014/0127488 | A1 | 5/2014 | Zhamu et al. | |
| 2014/0147648 | A1 | 5/2014 | Zhamu et al. | |
| 2014/0154941 | A1 | 6/2014 | Zhamu et al. | |
| 2014/0190676 | A1* | 7/2014 | Zhamu | F28F 21/02 165/185 |
| 2014/0209168 | A1 | 7/2014 | Zhamu et al. | |
| 2014/0242275 | A1 | 8/2014 | Zhamu et al. | |
| 2015/0111449 | A1 | 4/2015 | Cruz-Silva et al. | |

OTHER PUBLICATIONS

U.S. Appl. No. 11/509,424, filed Aug. 2006, B. Z. Jang, et al.
Julian Norley, "The Role of Natural Graphite in Electronics Cooling", Aug. 1, 2001 URL:https://www.electronics-cooling.com/2001/08/the-role-of-natural-graphite-in-electronics-cooling/ Figure 1-2.
International Search Report, PCT/US16/38743, dated Oct. 6, 2016.
Cong et al., "Wet-spinning assembly of continuous, neat, and macroscopic graphene fibers" Scientific Report (2012) vol. 2, pp. 613-618.
Dong et al., "Facile fabrication of light, flexible and multifunctional graphene fibers" Ad. Mater. (2012) vol. 24, pp. 1856-1861.
Xu et al "Graphene chiral liquid crystals and macroscopic assembled fibers" Nature Communications (2011) vol. 2, pp. 571-580.

* cited by examiner (75 μm wide)

Deviation angle > 45°

PRODUCTION OF HIGHLY ORIENTED GRAPHENE OXIDE FILMS AND GRAPHITIC FILMS DERIVED THEREFROM

FIELD OF THE INVENTION

The present invention relates generally to the field of graphitic materials and, more particularly, to a new form of graphene oxide film, a graphitic film derived from the graphene oxide film, and the process for producing such films. This new graphene oxide-derived graphitic film exhibits an unprecedented combination of exceptionally high degree of graphene crystal perfection and orientation, large crystal sizes, high thermal conductivity, high electrical conductivity, high tensile strength, and high elastic modulus.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different and random directions. Consequently, a natural graphite particle composed of multiple grains of different orientations exhibits an average property between these two extremes (i.e. between 5 W/mK and 1,800 W/mK).

It would be highly desirable in many applications to produce a graphitic film (thin or thick) containing single or multiple grains, having sufficiently large dimensions (i.e. large length and width) and having all graphene planes being essentially parallel to one another along one desired direction. In other words, it is highly desirable to have one large-size graphitic film (e.g. a fully integrated layer of multiple graphene planes) having the c-axis directions of all the graphene planes being substantially parallel to one another and having a sufficiently large film length and/or width for a particular application. It has not been possible to produce such a highly oriented graphitic film. Even though some attempts have been made to produce the so-called highly oriented pyrolytic graphite (HOPG) through tedious, energy intensive, and expensive chemical vapor deposition (CVD) followed by ultra-high temperature graphitization, the graphitic structure of the HOPG remains inadequately aligned and, hence, exhibits properties that are significantly lower than what are theoretically predicted.

The present invention is directed at a new materials science approach to designing and producing a new class of materials herein referred to as the highly oriented graphene oxide film (HOGOF) and the subsequently heat-treated version called graphitic film. A HOGOF is a thin-film structure composed of highly aligned graphene oxide planes, wherein all of the graphene or graphene oxide planes are essentially parallel to one another. The oxygen content of this HOGOF is typically from 5% to 50% by weight. When the HOGOF is heat-treated, the graphene planes in the resulting graphitic film are much better aligned than what the conventional HOPG has been able to achieve. The HOGOF-derived graphitic film has a thickness typically from 100 nm to 500 µm (can be up to 5 mm), but more typically from 1 µm to 200 µm, further more typically from 5 to 100 µm, and most typically between 10 µm and 50 µm. In most cases, the graphitic film has an oxygen amount of 0.001-5% by weight. The conventional HOPG contains no oxygen.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or graphene oxide sheets/platelets (collectively, NGPs) are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

NGPs are typically obtained by intercalating natural graphite particles with a strong acid and/or oxidizing agent to obtain a graphite intercalation compound (GIC) or graphite oxide (GO), as illustrated in FIG. 5(A) (process flow chart) and FIG. 5(B) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 5(A) and 100 in FIG. 5(B)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. This GIC or GO is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (24 or 104), which are each a collection of exfoliated, but largely unseparated graphite flakes that remain interconnected. A SEM image of graphite worms is presented in FIG. 6(A).

In Route 1A, these graphite worms (exfoliated graphite or "networks of interconnected/non-separated graphite flakes") can be re-compressed to obtain flexible graphite sheets or foils (26 or 106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs). Flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 6(B), wherein many flakes are inclined at an angle deviating from the desired orientation direction by >30°). Many flakes are inclined with respect to one another at a very large angle (e.g. mis-orientation of 20-40 degrees). The average deviation angle is greater than 10°, more typically >20°, and often >30°.

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 20 nm.

Route 2 entails ultrasonicating the graphite oxide suspension for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs include discrete sheets/platelets of single-layer and multi-layer pristine graphene, graphene oxide, or reduced graphene oxide (RGO). Pristine graphene has essentially 0% oxygen. RGO typically has an oxygen content of 0.001%-5% by weight. Graphene oxide (including RGO) can have 0.001%-50% by weight of oxygen.

It may be noted that flexible graphite foils (obtained by compressing or roll-pressing exfoliated graphite worms) for electronic device thermal management applications (e.g. as a heat sink material) have the following major deficiencies: (1) As indicated earlier, flexible graphite (FG) foils exhibit a relatively low thermal conductivity, typically <500 W/mK and more typically <300 W/mK. By impregnating the exfoliated graphite with a resin, the resulting composite exhibits an even lower thermal conductivity (typically <<200 W/mK, more typically <100 W/mK). (2) Flexible graphite foils, without a resin impregnated therein or coated thereon, are of low strength, low rigidity, and poor structural integrity. The high tendency for flexible graphite foils to get torn apart makes them difficult to handle in the process of making a heat sink. As a matter of fact, the flexible graphite sheets (typically 50-200 μm thick) are so "flexible" that they are not sufficiently rigid to make a fin component material for a finned heat sink. (3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 μm in lateral dimensions and >100 nm in thickness) can cause internal shorting and failure of electronic devices.

Similarly, solid NGPs (including discrete sheets/platelets of pristine graphene, GO, and RGO), when packed into a film, membrane, or paper sheet (34 or 114 in FIG. 5(A) or FIG. 5(B)) of non-woven aggregates using a paper-making process, typically do not exhibit a high thermal conductivity unless these sheets/platelets are closely packed and the film/membrane/paper is ultra-thin (e.g. <1 μm, which is mechanically weak). This is reported in our earlier U.S. patent application Ser. No. 11/784,606 (Apr. 9, 2007). However, ultra-thin film or paper sheets (<10 μm) are difficult to produce in mass quantities, and difficult to handle when one tries to incorporate these thin films as a heat sink material. In general, a paper-like structure or mat made from platelets of graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 7(B)), leading to relatively poor thermal conductivity, low electric conductivity, and low structural strength. These papers or aggregates of discrete NGP, GO or RGO platelets alone (without a resin binder) also have a tendency to get flaky, emitting conductive particles into air.

Another prior art graphitic material is the pyrolytic graphite film, typically thinner than 100 µm. The lower portion of FIG. 5(A) illustrates a typical process for producing prior art pyrolytic graphitic films from a polymer. The process begins with carbonizing a polymer film 46 (e.g. polyimide) at a carbonization temperature of 400-1,000° C. under a typical pressure of 10-15 Kg/cm² for 2-10 hours to obtain a carbonized material 48, which is followed by a graphitization treatment at 2,500-3,200° C. under an ultrahigh pressure of 100-300 Kg/cm² for 1-24 hours to form a graphitic film 50. It is technically utmost challenging to maintain such an ultrahigh pressure at such an ultrahigh temperature. This is a difficult, slow, tedious, energy-intensive, and extremely expensive process. Furthermore, it has been difficult to produce pyrolytic graphite film thinner than 15 µm or thicker than 50 µm from a polymer such as polyimide. This thickness-related problem is inherent to this class of materials due to their difficulty in forming into an ultra-thin (<10 µm) and thick film (>50 µm) while still maintaining an acceptable degree of polymer chain orientation and mechanical strength that are required of proper carbonization and graphitization. The carbonization and graphitization yield rates of these thin or thick films from PI are also known to be excessively low (typically <85% and often down to 50%).

A second type of pyrolytic graphite is produced by high temperature decomposition of hydrocarbon gases in vacuum followed by deposition of the carbon atoms to a substrate surface. This vapor phase condensation of cracked hydrocarbons is essentially a chemical vapor deposition (CVD) process. In particular, highly oriented pyrolytic graphite (HOPG) is the material produced by subjecting the CVD-deposited pyro-carbon to a uniaxial pressure at very high temperatures (typically 3,000-3,300° C.). This entails a thermo-mechanical treatment of combined and concurrent mechanical compression and ultra-high temperature for an extended period of time in a protective atmosphere; a very expensive, energy-intensive, time-consuming, and technically challenging process. The process requires ultra-high temperature equipment (with high vacuum, high pressure, or high compression provision) that is not only very expensive to make but also very expensive and difficult to maintain. Even with such extreme processing conditions, the resulting HOPG still possesses many defects, grain boundaries, and mis-orientations (neighboring graphene planes not parallel to each other), resulting in less-than-satisfactory in-plane properties. Typically, the best prepared HOPG sheet or block typically contains many poorly aligned grains or crystals and a vast amount of grain boundaries and defects.

Similarly, the most recently reported graphene thin film (<2 nm) prepared by catalytic CVD of hydrocarbon gas (e.g. $C_2H_4$) on Ni or Cu surface is not a single-grain crystal, but a poly-crystalline structure with many grain boundaries and defects. With Ni or Cu being the catalyst, carbon atoms obtained via decomposition of hydrocarbon gas molecules at 800-1,000° C. are deposited onto Ni or Cu foil surface to form a sheet of single-layer or few-layer graphene that is poly-crystalline. The grains are typically much smaller than 100 µm in size and, more typically, smaller than 10 µm in size. These graphene thin films, being optically transparent and electrically conducting, are intended for applications such as the touch screen (to replace indium-tin oxide or ITO glass) or semiconductor (to replace silicon, Si). Furthermore, the Ni- or Cu-catalyzed CVD process does not lend itself to the deposition of more than 5 graphene planes (typically <2 nm) beyond which the underlying Ni or Cu catalyst can no longer provide any catalytic effect. There has been no experimental evidence to indicate that CVD graphene layer thicker than 5 nm is possible. Both CVD graphene film and HOPG are extremely expensive.

Thus, it is an object of the present invention to provide a cost-effective process for producing graphene oxide (GO)-derived highly oriented graphitic film, which exhibits a thermal conductivity, electrical conductivity, elastic modulus, and/or tensile strength that is comparable to or greater than those of the HOPG, CVD graphene film, and/or flexible graphite. This process is capable of producing a highly oriented graphene oxide film and resulting graphitic film of practically any desired film thickness.

It is another object of the present invention to provide a process for producing GO-derived highly oriented graphene film thicker than 0.1 µm (preferably thicker than 1 µm) but thinner than 500 µm (preferably thinner than 200 µm, more preferably thinner than 100 µm, and most preferably from 5 to 50 µm) for use as a heat dissipation element in a smart phone, tablet computer, digital camera, display device, flat-panel TV, LED lighting device, etc. Such a thin film exhibits a combination of exceptional thermal conductivity, electrical conductivity, mechanical strength, and elastic modulus unmatched by any material of comparable thickness range. The highly oriented graphene film can exhibit an electrical conductivity greater than 12,000 S/cm, a thermal conductivity greater than 1,500 W/mK, a physical density greater than 2.1 g/cm³, a tensile strength greater than 120 MPa, and/or an elastic modulus greater than 120 GPa. No other material is known to exhibit this set of outstanding properties.

SUMMARY OF THE INVENTION

The present invention provides a process for producing a highly oriented graphene oxide film (HOGOF). The process comprises: (a) preparing either a graphene oxide dispersion having graphene oxide sheets dispersed in a fluid medium or a graphene oxide gel having graphene oxide molecules dissolved in a fluid medium, wherein the graphene oxide sheets or graphene oxide molecules contain an oxygen content higher than 5% by weight (typically from 20% to 50% by weight); (b) dispensing the graphene oxide dispersion or graphene oxide gel onto a surface of an application roller rotating in a first direction at a first line velocity (the line speed at the external surface of the application roller) to form an applicator layer of graphene oxide, wherein the application roller transfers this applicator layer of graphene oxide to a surface of a supporting film driven in a second direction opposite to the first direction at a second line velocity, forming a wet layer of graphene oxide on the supporting film; and (c) at least partially removing the fluid medium from the wet layer of graphene oxide to form a dried layer of graphene oxide having an inter-planar spacing $d_{002}$ of 0.4 nm to 1.2 nm as determined by X-ray diffraction and an oxygen content no less than 5% by weight, wherein the graphene oxide sheets or molecules in the dried layer of graphene oxide are substantially parallel to one another along one direction and the average deviation angle of these sheets or molecules is less than 10 degrees. It may be noted that, in conventional GO or RGO sheet-based paper, graphene sheets or platelets are inclined with respect to one another at a very large angle (e.g. mis-orientation of 20-40 degrees). The average deviation angle from the desired orientation angle is greater than 10°, more typically >20°, and often >30°.

In a preferred embodiment, the supporting film is driven by a counter-rotating supporting roller disposed at a working distance from the application roller and rotating in the second direction opposite to the first direction. The speed at the external surface of this supporting roller dictates the second line velocity (of the supporting film). Preferably, the supporting film is fed from a feeder roller and the dried layer of graphene oxide supported by the supporting film is wound on a winding roller and the process is conducted in a roll-to-roll manner.

In some embodiments, the step of dispensing the graphene oxide dispersion or graphene oxide gel onto the surface of the application roller includes using a metering roller and/or a doctor's blade to provide a desired thickness of the applicator layer of graphene oxide on the application roller surface. In general, the process includes operating 2, 3, or 4 rollers. Preferably, the process includes a reverse roll coating procedure, also herein referred to as reverse roll transfer.

In certain embodiments, the velocity ratio, defined as (the second line velocity)/(first line velocity), is from 1/5 to 5/1. If the external surface of the application roller moves at the same speed as the linear movement speed of the supporting film, then the velocity ratio is 1/1 or unity. If, as an example, the external surface of the application roller moves at a speed three times as fast as the linear movement speed of the supporting film, then the velocity ratio is 3/1. In certain embodiments, the velocity ratio is greater than 1/1 and less than 5/1. Preferably, the velocity ratio is greater than 1/1 and up to 3/1.

Preferably, the process further comprises a step of aging the wet or dried layer of graphene oxide in an aging room at an aging temperature from 25° C. to 100° C. (preferably from 25° C. to 55° C.) and humidity level from 20% to 99% for an aging time of 1 hour to 7 days to form an aged layer of graphene oxide.

In some embodiments, the process further comprises a step (d) of heat treating the dried or dried and aged layer of graphene oxide at a first heat treatment temperature higher than 55° C. but no greater than 2,200° C. for a desired length of time to produce a graphitic film having an inter-planar spacing $d_{002}$ less than 0.4 nm and an oxygen content less than 5% by weight. The process can further comprise a compression step, during or after said step (d), to reduce the thickness of the graphitic film.

The process may further include a step of heat-treating the graphitic film at a second heat treatment temperature higher than 2,200° C. for a length of time sufficient for decreasing an inter-plane spacing $d_{002}$ to a value of from 0.3354 nm to 0.36 nm and decreasing the oxygen content to less than 2% by weight. The process can further comprise a compression step to reduce the thickness of the graphitic film during or after heat-treating the graphitic film at the second heat treatment temperature.

The graphitic film typically has a thickness less than 5 mm, more typically less than 1 mm, still more typically less than 500 μm, even more typically less than 200 μm, preferably less than 100 μm, and more preferably from 100 nm to 20 μm.

In certain embodiments, the fluid medium consists of water and/or an alcohol. In an embodiment, the fluid medium further contains pristine graphene sheets and a pristine graphene to graphene oxide ratio is from 1/100 to 100/1.

In the invented process, the graphene oxide sheets in the graphene oxide dispersion preferably occupy a weight fraction of 0.1% to 25% based on the total weight of graphene oxide sheets and liquid medium combined. More preferably, the graphene oxide sheets in the graphene oxide dispersion occupy a weight fraction of 0.5% to 15%. In some embodiments, graphene oxide sheets occupy a weight proportion from 3% to 15% based on the total weight of graphene oxide sheets and liquid medium combined. In certain embodiments, the graphene oxide dispersion or graphene oxide gel has greater than 3% by weight of graphene oxide dispersed in the fluid medium to form a liquid crystal phase.

The graphene oxide dispersion or graphene oxide gel may be prepared by immersing a graphitic material in a powder or fibrous form in an oxidizing liquid in a reaction vessel at a reaction temperature for a length of time sufficient to obtain said graphene oxide dispersion or said graphene oxide gel wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

In an embodiment, the first heat treatment temperature contains a temperature in the range of 500° C.-1,500° C. and the graphitic film has an oxygen content less than 1%, an inter-graphene spacing less than 0.345 nm, a thermal conductivity of at least 1,000 W/mK, and/or an electrical conductivity no less than 3,000 S/cm. In another embodiment, the first and/or second heat treatment temperature contains a temperature in the range of 1,500° C.-2,200° C. and the graphitic film has an oxygen content less than 0.01%, an inter-graphene spacing less than 0.337 nm, a thermal conductivity of at least 1,300 W/mK, and/or an electrical conductivity no less than 5,000 S/cm.

In certain embodiments, the second heat treatment temperature contains a temperature greater than 2,500° C. and the graphitic film has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm.

In certain embodiments (e.g. with an aged layer), the first and/or second heat treatment temperature contains a temperature no less than 2,500° C. and the graphitic film has an inter-graphene spacing less than 0.336 nm, a mosaic spread value no greater than 0.4, a thermal conductivity greater than 1,600 W/mK, and/or an electrical conductivity greater than 10,000 S/cm.

In one embodiment, the resulting graphitic film exhibits an inter-graphene spacing less than 0.337 nm and a mosaic spread value less than 1.0. In another embodiment, the graphitic film exhibits a degree of graphitization no less than 80% and/or a mosaic spread value less than 0.4. Preferably, the graphitic film exhibits a degree of graphitization no less than 90% and/or a mosaic spread value no greater than 0.4.

The graphene oxide dispersion or graphene oxide gel may be obtained from a graphitic material having a maximum original graphite grain size and the resulting graphitic film is a poly-crystal graphene structure having a grain size larger than this maximum original grain size. This larger grain size is due to the notion that heat-treating of GO sheets or GO molecules induces chemical linking, merging, or chemical bonding of graphene oxide sheets or graphene oxide molecules in an edge-to-edge manner. It may be noted that such an edge-to-edge linking significantly increases the length or width of graphene sheets or molecules. For instance, a GO sheet 300 nm in length, if merged with a GO sheet 400 nm in length could result in a sheet of approximately 700 nm in length. Such an edge-to-edge merging of multiple GO sheets enables production of graphene films having huge grain sizes that could not be obtained otherwise.

In an embodiment, the graphene oxide dispersion or graphene oxide gel is obtained from a graphitic material having multiple graphite crystallites exhibiting no preferred crystalline orientation as determined by an X-ray diffraction or electron diffraction method and the resulting graphitic film is a single crystal or a poly-crystal graphene structure having a preferred crystalline orientation as determined by said X-ray diffraction or electron diffraction method.

In certain embodiments (e.g. when the first heat treatment temperature is lower than 1,000° C.), the resulting graphitic film has an electrical conductivity greater than 5,000 S/cm, a thermal conductivity greater than 800 W/mK, a physical density greater than 1.9 g/cm$^3$, a tensile strength greater than 80 MPa, and/or an elastic modulus greater than 60 GPa.

In certain embodiments (e.g. first heat treatment temperature is higher than 1,500° C.), the graphitic film has an electrical conductivity greater than 8,000 S/cm, a thermal conductivity greater than 1,200 W/mK, a physical density greater than 2.0 g/cm$^3$, a tensile strength greater than 100 MPa, and/or an elastic modulus greater than 80 GPa.

In certain embodiments (e.g. first heat treatment temperature is higher than 2,200° C.), the graphitic film has an electrical conductivity greater than 12,000 S/cm, a thermal conductivity greater than 1,500 W/mK, a physical density greater than 2.1 g/cm$^3$, a tensile strength greater than 120 MPa, and/or an elastic modulus greater than 120 GPa.

The present invention also provides a graphitic film produced by a process as herein defined and a thermal management device containing such a graphitic film as a heat spreader.

The reverse roll procedure is a critically important step in the production of the presently invented graphitic film based on the surprising observation that this procedure enables the GO sheets or GO molecules to align themselves along a particular direction (e.g. X-direction or length-direction) or two particular directions (e.g. X- and Y-directions or length and width directions) to produce preferred orientations. Further surprisingly, these preferred orientations are preserved and often further enhanced during the subsequent heat treatment of the GO layers to produce the highly oriented graphene film. Most surprisingly, such preferred orientations are essential to the eventual attainment of exceptionally high thermal conductivity, electrical conductivity, elastic modulus, and tensile strength of the resulting graphitic film (even for thick films; e.g. those >50 µm, >100 µm, >200 µm, or even >500 µm) along a desired direction. These great properties in this desired direction could not be obtained without such a reverse roll procedure-induced orientation control. During the coating or casting processes, other than the presently invented reverse roll procedure-based process, the thickness of the coated or cast films (layers) cannot be too high, otherwise a high degree of GO sheet orientation cannot be achieved. In general, in these conventional processes, the coated or cast films (wet layers) must be sufficiently thin so that when they become dried, they form a dried layer of graphene oxide having a thickness no greater than 50 µm, more typically no greater than 20 µm, and most typically no greater than 10 µm. Through extensive and in-depth experimental studies we have come to unexpectedly realize that the reverse roll procedure is so effective in achieving and maintaining a high degree of preferred orientation even for very thick films.

This new class of materials (i.e., highly oriented GO-derived graphitic films, GOGF, produced by the reverse roll-based procedure) has the following characteristics that distinguish themselves from highly oriented pyrolytic graphite (HOPG), flexible graphite sheets, and paper/film/membrane sheets of discrete graphene/GO/RGO sheets/platelets:

(1) This GOGF is an integrated graphene entity that is either a graphene single crystal (single grain only) or a poly-crystal (multiple grains with exceptionally large grain sizes). The HOGF has all the graphene planes in all the grains being essentially oriented parallel to one another (i.e., the crystallographic c-axis of all grains essentially pointing in an identical direction).

(2) With a reverse roll procedure, such a high degree of orientation can be achieved even with thick films, not just thin films. Given the same thickness, the reverse roll procedure enables the high degree of orientation and high degree of crystal perfection at a significantly lower heat treatment temperature.

(3) The GOGF is an integrated graphene entity that is not a simple aggregate or stack of multiple discrete graphite flakes or discrete platelets of graphene/GO/RGO, and does not contain any discernible or discrete flake/platelet derived from the original GO sheets. These originally discrete flakes or platelets have been chemically bonded or linked together to form larger grains (grain size being larger than the original platelet/flake size).

(4) This GOGF is not made by using a binder or adhesive to glue discrete flakes or platelets together. Instead, under select heat treatment conditions, well-aligned GO sheets or GO molecules are capable of chemically merging with one another mainly in an edge-to-edge manner to form giant 2-D graphene grains, but possibly also with adjacent GO sheets below or above to form 3-D networks of graphene chains. Through joining or forming of covalent bonds with one another, the GO sheets are adhered into an integrated graphene entity, without using any externally added linker or binder molecules or polymers.

(5) This GOGF, a single crystal or poly-crystal with essentially all graphene planes having an identical crystallographic c-axis, is derived from GO, which is in turn obtained from moderate or heavy oxidation of natural graphite or artificial graphite particles each originally having multiple graphite crystallites that are randomly oriented. Prior to being chemically oxidized to become GO dispersion (moderate-to-heavy oxidation of graphite) or GO gel (heavy oxidation for a sufficiently long oxidation time to achieve fully separated GO molecules dissolved in water or other polar liquid), these starting or original graphite crystallites have an initial length ($L_a$ in the crystallographic a-axis direction), initial width ($L_b$ in the b-axis direction), and thickness ($L_c$ in the c-axis direction). The resulting GOGF typically has a length or width significantly greater than the $L_a$ and $L_b$ of the original graphite crystallites.

(6) This process involves significantly lower heat treatment temperatures and lower pressure as compared with the processes for producing HOPG from either carbonized polymers (e.g. polyimide) or the CVD graphite. The presently invented process is simpler (hence, more reliable), faster, less energy-intensive, and highly scalable.

(7) This process for producing a bulk GO-derived GOGF can be conducted on a continuous roll-to-roll basis and, hence, is much more cost-effective. No other process is known to be capable of producing HOPG structures on a continuous basis.

DESCRIPTION OF THE PREFERRED EMBODIMENTS

Figure 1:
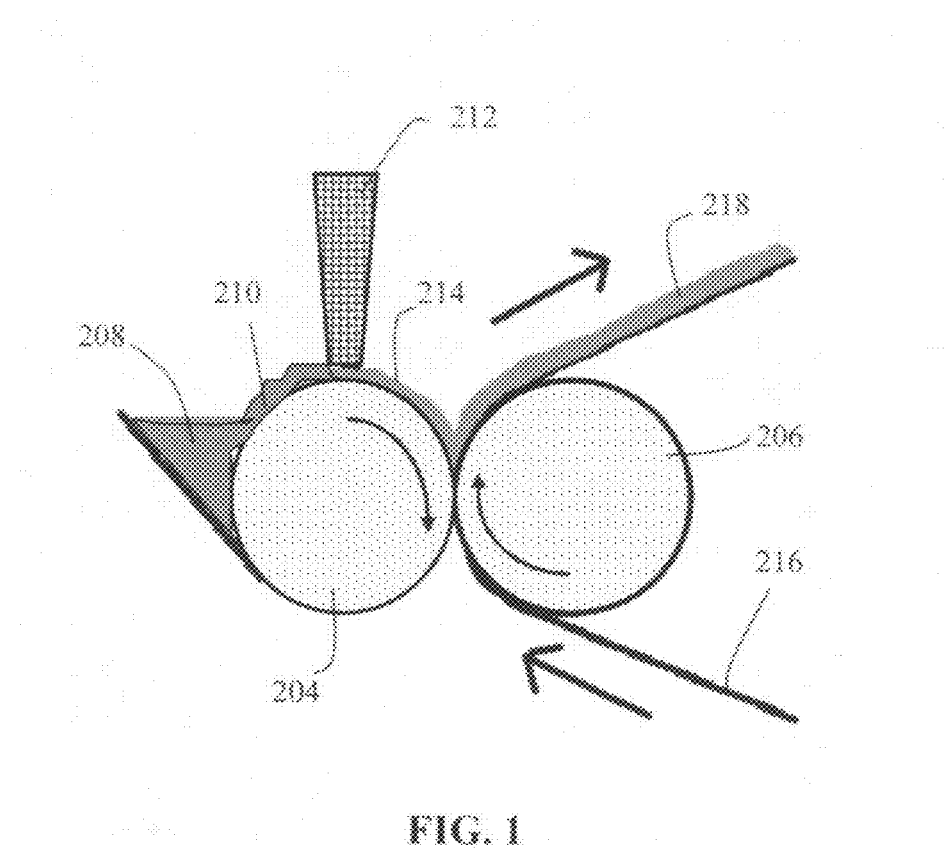
FIG. 1 Schematic of a reverse roll-based GO layer transfer apparatus for producing highly oriented GO films.

The present invention provides a process for producing a highly oriented graphene oxide film (HOGOF) and a graphitic film obtained by heat-treating the HOGOF. As schematically illustrated in FIG. 1, as a preferred embodiment, the process of producing HOGOF begins with preparation of a graphene oxide dispersion (GO dispersion) or graphene oxide gel (GO gel) that is delivered to a trough 208. The rotational motion of an application roller 204 in a first direction enables the delivery of a continuous layer 210 of GO dispersion or gel onto the exterior surface of the application roller 204. An optional doctor's blade 212 is used to regulate the thickness (amount) of an applicator layer 214 of graphene oxide (GO). This applicator layer is continuously delivered to the surface of a supporting film 216 moving in a second direction (e.g. driven by a counter-rotating roller 206, rotating in a direction opposite to the first direction) to form a wet layer 218 of graphene oxide. This wet layer of GO is then subjected to a liquid removal treatment (e.g. under a heating environment and/or being vacuum-pumped).

In summary, the process for producing HOGOF comprises:
(a) preparing either a graphene oxide dispersion having graphene oxide sheets dispersed in a fluid medium or a graphene oxide gel having graphene oxide molecules dissolved in a fluid medium, wherein the graphene oxide sheets or graphene oxide molecules contain an oxygen content higher than 5% by weight;
(b) dispensing the graphene oxide dispersion or graphene oxide gel onto a surface of an application roller rotating in a first direction at a first line velocity (the line speed at the external surface of the application roller) to form an applicator layer of graphene oxide and transferring this applicator layer of graphene oxide to a surface of a supporting film driven in a second direction opposite to the first direction at a second line velocity, forming a wet layer of graphene oxide on the supporting film; and
(c) at least partially removing the fluid medium from the wet layer of graphene oxide to form a dried layer of graphene oxide having an inter-planar spacing $d_{002}$ of 0.4 nm to 1.2 nm as determined by X-ray diffraction and an oxygen content no less than 5% by weight.

In a preferred embodiment, the supporting film is driven by a counter-rotating supporting roller (e.g. 206 in FIG. 1) disposed at a working distance from the application roller and rotating in the second direction opposite to the first direction. The speed at the external surface of this supporting roller dictates the second line velocity (of the supporting film). Preferably, the supporting film is fed from a feeder roller and the dried layer of graphene oxide supported by the supporting film is wound on a winding roller and the process is conducted in a roll-to-roll manner.

Figure 2:
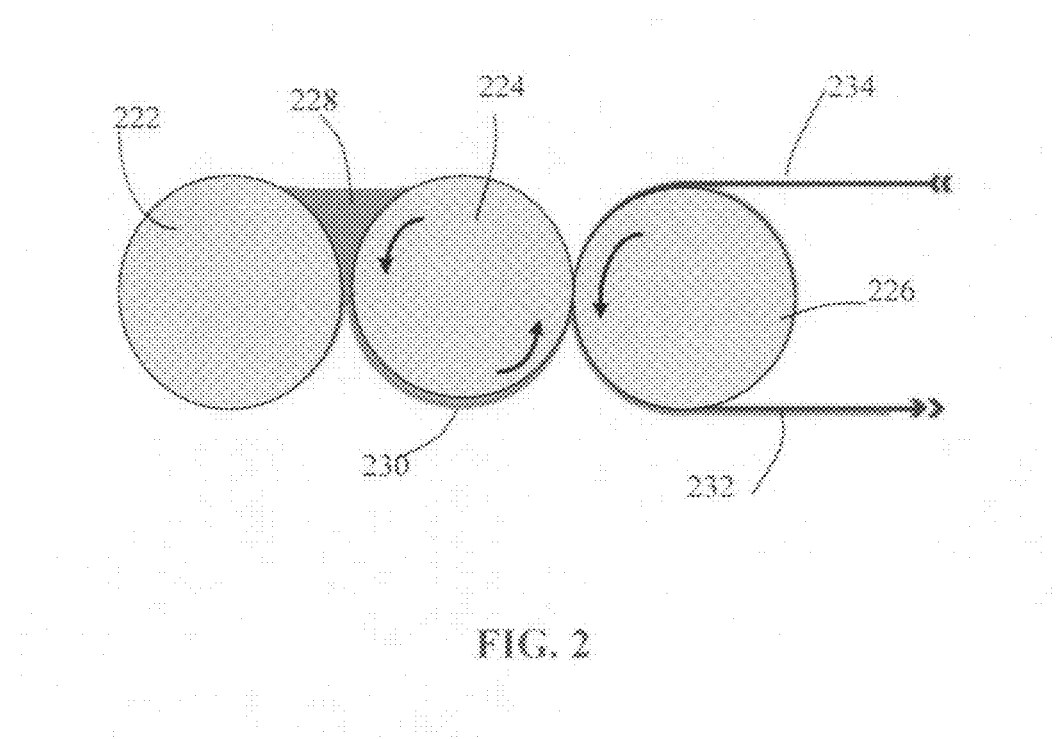
FIG. 2 Schematic of another reverse roll-based GO layer transfer apparatus for producing highly oriented GO films.
Figure 3:
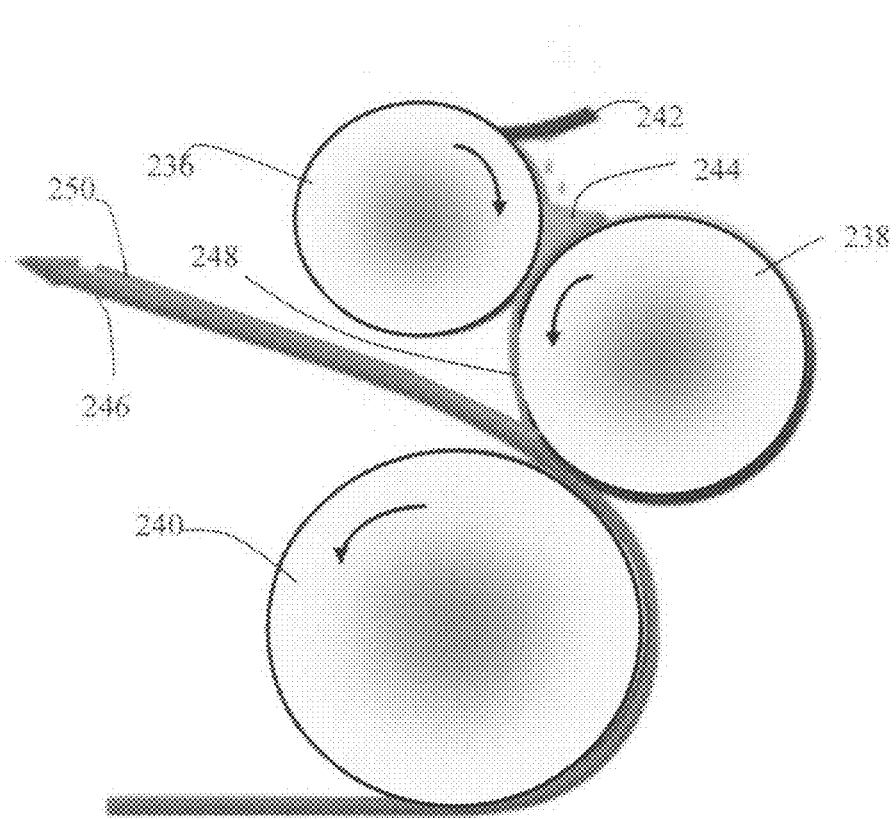
FIG. 3 Schematic of yet another reverse roll-based GO layer transfer apparatus for producing highly oriented GO films.
Figure 4:
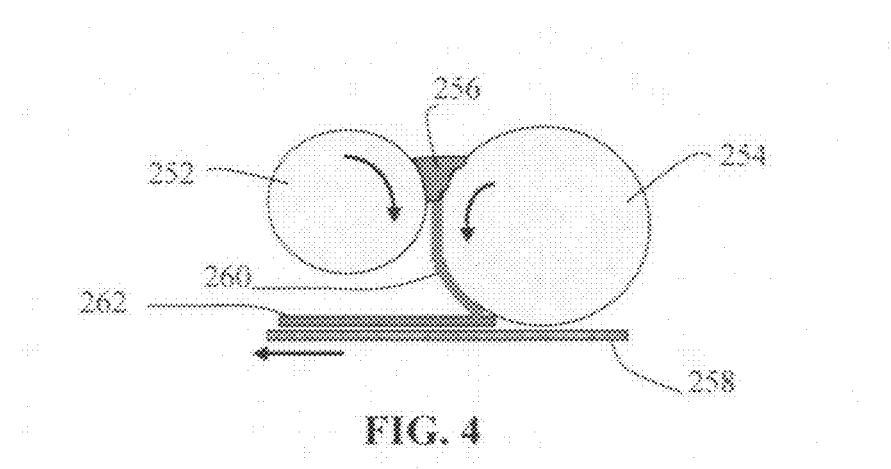
FIG. 4 Schematic of still another reverse roll-based GO layer transfer apparatus for producing highly oriented GO films.

This process is further illustrated in FIG. 2, FIG. 3, and FIG. 4. In a preferred embodiment, as illustrated in FIG. 2, the GO dispersion/gel trough 228 is naturally formed between an application roller 224 and a metering roller 222 (also referred to as a doctor's roller). The relative motion or rotation of the application roller 224, relative to the metering roller 222, at a desired speed generates an applicator layer 230 of GO on the exterior surface of the application roller 224. This applicator layer of GO is then transferred to form a wet layer 232 of GO on the surface of a supporting film 234 (driven by a supporting roller 226 counter-rotating in a direction opposite to the rotational direction of the applicator roller 224). The wet layer may then be subjected to a drying treatment.

In another preferred embodiment, as illustrated in FIG. 3, the GO dispersion/gel trough 244 is naturally formed between an application roller 238 and a metering roller 236. The relative motion or rotation of the application roller 238, relative to the metering roller 236, at a desired speed generates an applicator layer 248 of GO on the exterior surface of the application roller 238. A doctor's blade 242 may be used to scratch off any GO gel/dispersion carried on the exterior surface of the metering roller 236. This applicator layer 248 of GO is then transferred to form a wet layer 250 of GO on the surface of a supporting film 246 (driven by a supporting roller 240 counter-rotating in a direction opposite to the rotational direction of the applicator roller 238). The wet layer may then be subjected to a drying treatment.

In yet another preferred embodiment, as illustrated in FIG. 4, the GO dispersion/gel trough 256 is naturally formed between an application roller 254 and a metering roller 252. The relative motion or rotation of the application roller 254, relative to the metering roller 252, at a desired speed generates an applicator layer 260 of GO on the exterior surface of the application roller 254. This applicator layer 260 of GO is then transferred to form a wet layer 262 of GO on the surface of a supporting film 258, driven to move in a direction opposite to the tangential rotational direction of the applicator roller 254. This supporting film 258 may be fed from a feeder roller (not shown) and taken up (wound) on a winding roller (not shown), which may also be a driving roller. There would be at least 4 rollers in this example. There can be a heating zone after the wet layer of GO is formed to at least partially remove the liquid medium (e.g. water) from the wet layer to form a dried layer of GO.

In some embodiments, the step of dispensing the graphene oxide dispersion or graphene oxide gel onto the surface of the application roller includes using a metering roller and/or a doctor's blade to provide a desired thickness of the applicator layer of graphene oxide on the application roller surface. In general, the process includes operating 2, 3, or 4 rollers. Preferably, the process includes a reverse roll coating procedure.

It may be noted that the velocity ratio, defined as (the second line velocity)/(first line velocity), is from 1/5 to 5/1. If the external surface of the application roller moves at the same speed as the linear movement speed of the supporting film, then the velocity ratio is 1/1 or unity. If, as an example, the external surface of the application roller moves at a speed three times as fast as the linear movement speed of the supporting film, then the velocity ratio is 3/1. As a consequence, the transferred wet layer of GO would be approximately 3-fold in thickness as compared to the applicator layer of GO. Quite unexpectedly, this enables the production of much thicker layer yet still maintaining a high degree of GO orientation in the wet layer, the dried layer, and the subsequently heat-treated graphitic film. This is a highly significant and desirable outcome since a high degree of GO sheet orientation could not be achieved with thick films (e.g. >50 μm in thickness) by using casting or other coating techniques such as comma coating and slot-die coating. In certain embodiments, the velocity ratio is greater than 1/1 and less than 5/1. Preferably, the velocity ratio is greater than 1/1 and equal to or less than 3/1.

Preferably, the process further comprises a step of aging the wet or dried layer of graphene oxide in an aging room at an aging temperature from 25° C. to 100° C. (preferably from 25° C. to 55° C.) and humidity level from 20% to 99% for an aging time of 1 hour to 7 days to form an aged layer of graphene oxide. We have surprisingly observed that this aging procedure enables some chemical linking or merging of GO sheets or molecules in an edge-to-edge manner, as manifested by the observation by microscopy that the average length/width of the GO sheets is significantly increased (by a factor of 2-3) after aging. This would make it possible to maintain the sheet orientation, accelerate subsequent edge-to-edge linking to huge grans or crystal domains, and facilitating graphitization of graphitic domains at a much lower temperature.

In some embodiments, the process further comprises a step (d) of heat treating the dried or dried and aged layer of graphene oxide at a first heat treatment temperature higher than 55° C. but no greater than 2,200° C. for a desired length of time to produce a graphitic film having an inter-planar spacing $d_{002}$ less than 0.4 nm and an oxygen content less than 5% by weight. The process can further comprise a compression step, during or after said step (d), to reduce the thickness of the graphitic film.

The process may further include a step of heat-treating the graphitic film at a second heat treatment temperature higher than 2,200° C. for a length of time sufficient for decreasing an inter-plane spacing $d_{002}$ to a value of from 0.3354 nm to 0.36 nm and decreasing the oxygen content to less than 2% by weight. The process can further comprise a compression step to reduce the thickness of the graphitic film during or after heat-treating the graphitic film at the second heat treatment temperature.

The graphitic film typically has a thickness less than 5 mm, more typically less than 1 mm, still more typically less than 500 μm, even more typically less than 200 μm, preferably less than 100 μm, and more preferably from 100 nm to 50 μm.

In certain embodiments, the fluid medium consists of water and/or an alcohol. In an embodiment, the fluid medium further contains pristine graphene sheets and a pristine graphene to graphene oxide ratio is from 1/100 to 100/1.

In the invented process, the graphene oxide sheets in the graphene oxide dispersion preferably occupy a weight fraction of 0.1% to 25% based on the total weight of graphene oxide sheets and liquid medium combined. More preferably, the graphene oxide sheets in the graphene oxide dispersion occupy a weight fraction of 0.5% to 15%. In some embodiments, graphene oxide sheets occupy a weight proportion from 3% to 15% based on the total weight of graphene oxide sheets and liquid medium combined. In certain embodiments, the graphene oxide dispersion or graphene oxide gel has greater than 3% by weight of graphene oxide dispersed in the fluid medium to form a liquid crystal phase.

The graphitic film contains chemically bonded and merged graphene planes. These planar aromatic molecules or graphene planes (hexagonal structured carbon atoms having a small amount of oxygen-containing group) are parallel to one another. The lateral dimensions (length or width) of these planes are huge, typically several times or even orders of magnitude larger than the maximum crystallite dimension (or maximum constituent graphene plane dimension) of the starting graphite particles. The presently invented graphitic film is a "giant graphene crystal" or "giant planar graphene particle" having all constituent graphene planes being essentially parallel to one another. This is a unique and new class of material that has not been previously discovered, developed, or suggested to possibly exist.

The dried GO mass has a high birefringence coefficient between an in-plane direction and the normal-to-plane direction. The oriented graphene oxide layer is itself a very unique and novel class of material that surprisingly has great cohesion power (self-bonding, self-polymerizing, and self-crosslinking capability). These characteristics have not been taught or hinted in the prior art. The GO is obtained by immersing powders or filaments of a starting graphitic material in an oxidizing liquid medium (e.g. a mixture of sulfuric acid, nitric acid, and potassium permanganate) in a reaction vessel. The starting graphitic material may be selected from natural graphite, artificial graphite, mesophase carbon, meso-phase pitch, meso-carbon micro-bead, soft carbon, hard carbon, coke, carbon fiber, carbon nano-fiber, carbon nano-tube, or a combination thereof.

When the starting graphite powders or filaments are mixed in the oxidizing liquid medium, the resulting slurry is a heterogeneous suspension and appears dark and opaque. When the oxidation of graphite proceeds at a reaction temperature for a sufficient length of time, the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel. The GO gel is optically translucent and is essentially a homogeneous solution, as opposed to a heterogeneous suspension.

This GO suspension or GO gel typically contains some excess amount of acids and can be advantageously subjected to some acid dilution treatment to increase the pH value (preferably >4.0). The GO suspension (dispersion) preferably contain at least 1% by weight of GO sheets dispersed in a liquid medium, more preferably at least 3% by weight, and most preferably at least 5% by weight. It is advantageous to have an amount of GO sheets sufficient for forming a liquid crystalline phase. We have surprisingly observed that GO sheets in a liquid crystal state have the highest tendency to get readily oriented under the influence of a shear stress created by a commonly used casting or coating process.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT, higher than the first. The highest or final HTT that the GO layer experiences may be divided into four distinct heat HTT regimes:

Regime 1 (up to 200° C.): In this temperature range (the post-aging and thermal reduction regime), a GO layer primarily undergoes thermally-induced reduction reactions, leading to a reduction of oxygen content from typically 20-50% (as dried) to approximately 5-6%. This treatment results in a reduction of inter-graphene spacing from approximately 0.6-1.2 nm (as dried) down to approximately 0.4 nm, and an increase in in-plane thermal conductivity from approximately 100 W/mK to 450 W/mK. Even with such a low temperature range, some edge-to-edge chemical linking occurs. The GO molecules remain well-aligned, but the inter-GO spacing remains relatively large (0.4 nm or larger). Many 0-containing functional groups survive.

Regime 2 (200° C.-1,000° C.): In this active chemical linking regime, extensive chemical combination, polymerization, and cross-linking between adjacent GO sheets or GO molecules occur. The oxygen content is reduced to typically 0.7% (<<1%) after chemical linking, resulting in a reduction of inter-graphene spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphitic film and its production processes. These chemical linking reactions result in an increase in in-plane thermal conductivity to 800-1,200 W/mK, and/or in-plane electrical conductivity to 3,000-4,000 S/cm.

Regime 3 (1,000-2,200° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in in-plane thermal conductivity to >1,200-1,500 W/mK, and/or in-plane electrical conductivity to 5,000-7,000 S/cm.

Regime 4 (higher than 2,200° C.): In this re-crystallization and perfection regime, extensive movement and elimination of grain boundaries and other defects occur, resulting in the formation of nearly perfect single crystals or poly-crystalline graphene crystals with huge grains, which can be orders of magnitude larger than the original grain sizes of the starting graphite particles for the production of GO suspension. The oxygen content is essentially eliminated, typically 0.001% or less. The inter-graphene spacing is reduced to down to approximately 0.3354 nm (degree of graphitization from 80% to nearly 100%), corresponding to that of a perfect graphite single crystal. Quite interestingly, the graphene poly-crystal has all the graphene planes being closely packed and bonded, and all the planes are aligned along one direction, a perfect orientation. Such a perfectly oriented structure has not been produced even with the HOPF that was produced by subjecting pyrolytic graphite concurrently to an ultra-high temperature (3,400° C.) under an ultra-high pressure (300 Kg/cm$^2$). The highly oriented graphene structure can achieve such a highest degree of perfection with a significantly lower temperature and an ambient (or slightly higher compression) pressure. The structure thus obtained exhibits an in-plane thermal conductivity up to slightly >1,700 W/mK, and in-plane electrical conductivity to a range from 15,000 to 20,000 S/cm.

The presently invented highly oriented graphene oxide layer can be heat-treated with a temperature program that covers at least the first regime (typically requiring 1-4 hours in this temperature range if the temperature never exceeds 200° C.), more commonly covers the first two regimes (1-2 hours preferred), still more commonly the first three regimes (preferably 0.5-2.0 hours in Regime 3), and most commonly all the 4 regimes (Regime 4, for 0.2 to 1 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354\ g+0.344\ (1-g)$, where $d_{002}$ is the interlayer spacing of graphite or graphene crystal in nm. This equation is valid only when $d_{002}$ is equal or less than approximately 0.3440 nm. The graphitic film having a $d_{002}$ higher than 0.3440 nm reflects the presence of oxygen-containing functional groups (such as —OH, >O, and —COOH on graphene molecular plane surfaces) that act as a spacer to increase the inter-graphene spacing.

Another structural index that can be used to characterize the degree of ordering of the presently invented graphitic film and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphitic films have a mosaic spread value in this range of 0.2-0.4 (if produced with a heat treatment temperature (HTT) no less than 2,200° C.). However, some values are in the range of 0.4-0.7 if the HTT is between 1,000 and 2,200° C., and in the range of 0.7-1.0 if the HTT is between 200 and 1,000° C.

The graphene oxide suspension may be prepared by immersing a graphitic material (in a powder or fibrous form) in an oxidizing liquid to form a reacting slurry in a reaction vessel at a reaction temperature for a length of time sufficient to obtain GO sheets dispersed in a residual liquid. Typically, this residual liquid is a mixture of acid (e.g. sulfuric acid) and oxidizer (e.g. potassium permanganate or hydrogen peroxide). This residual liquid is then washed and replaced with water and/or alcohol to produce a GO dispersion wherein discrete GO sheets (single-layer or multi-layer GO) are dispersed in the fluid. The dispersion is a heterogeneous suspension of discrete GO sheets suspended in a liquid medium and it looks optically opaque and dark (relatively low degree of oxidation) or slightly green and yellowish (if the degree of oxidation is high).

Now, if the GO sheets contain a sufficient amount of oxygen-containing functional groups and the resulting dispersion (suspension or slurry) is mechanically sheared or ultrasonicated to produce individual GO sheets or molecules that are dissolved (not just dispersed) in water and/or alcohol or other polar solvent, we can reach a material state called "GO gel" in which all individual GO molecules are surrounded by the molecules of the liquid medium. The GO gel looks like a homogeneous solution which is translucent and no discernible discrete GO or graphene sheets can be visibly identified. Useful starting graphitic materials include natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. As the oxidizing reaction proceeds to a critical extent and individual GO sheets are fully separated (now with graphene plane and edges being heavily decorated with oxygen-containing groups), an optically transparent or translucent solution is formed, which is the GO gel.

Preferably, the GO sheets in such a GO dispersion or the GO molecules in such a GO gel are in the amount of 1%-15% by weight, but can be higher or lower. More preferably, the GO sheets are 2%-10% by weight in the suspension. Most preferably, the amount of GO sheets is sufficient to form a liquid crystal phase in the dispersing liquid. The GO sheets have an oxygen content typically in the range from 5% to 50% by weight, more typically from 10% to 50%, and most typically from 20% to 46% by weight.

The aforementioned features are further described and explained in detail as follows: As illustrated in FIG. 5(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 5(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 5(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

Figure 5A:
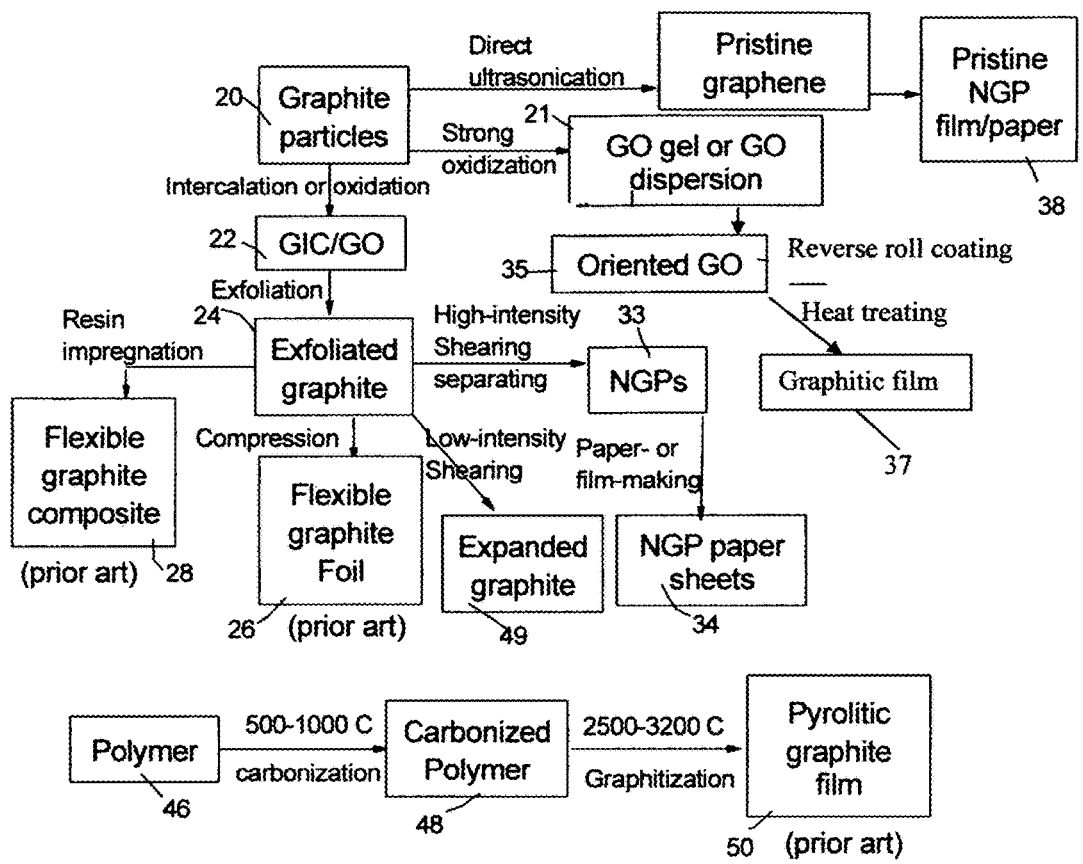
FIG. 5(A) A flow chart illustrating various prior art processes of producing exfoliated graphite products (flexible graphite foils and flexible graphite composites) and pyrolytic graphite (bottom portion), along with a process for producing graphene oxide gel or GO dispersion.
Figure 5B:
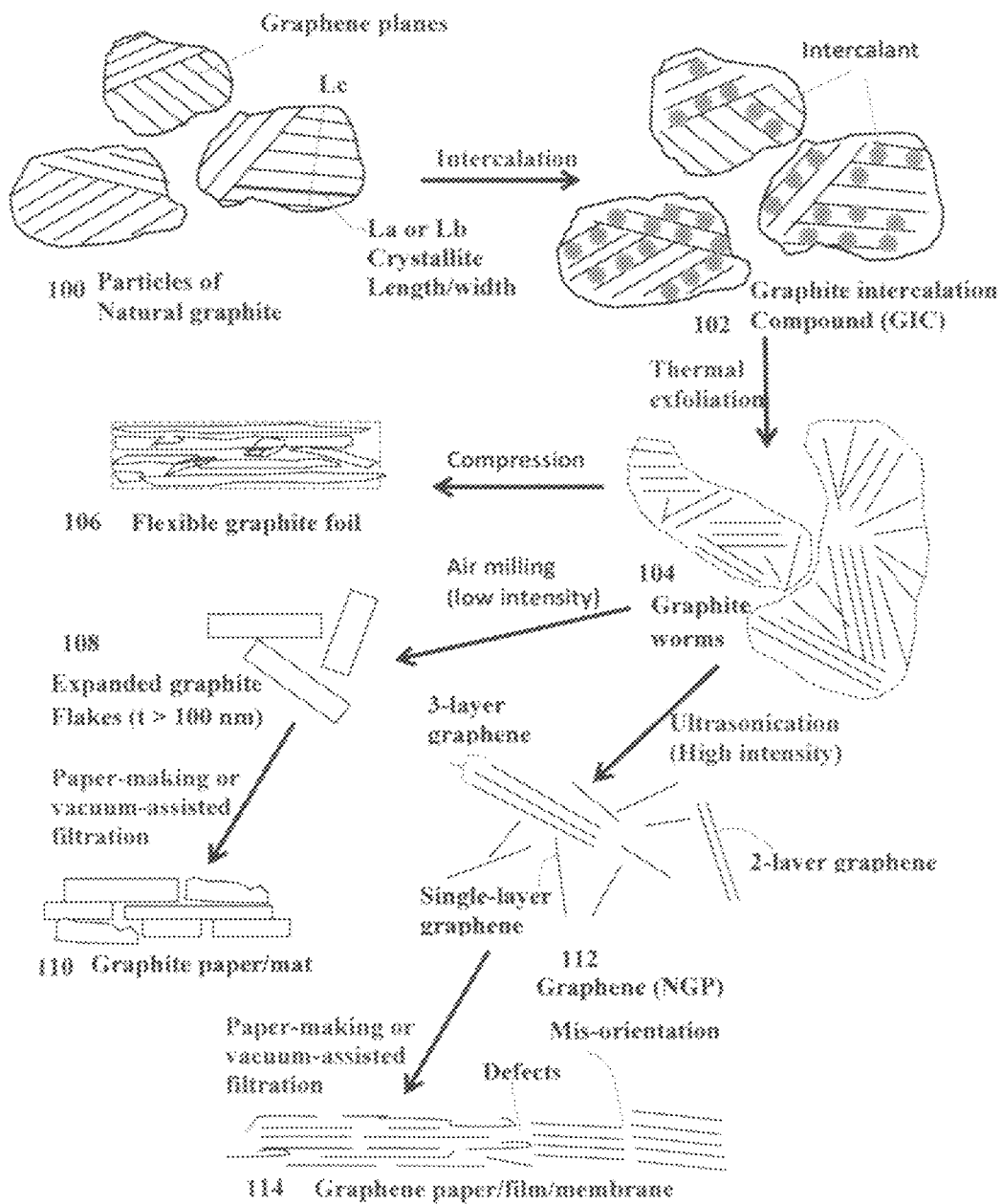
FIG. 5(B) Schematic drawing illustrating the processes for producing conventional paper, mat, film, and membrane of simply aggregated graphite or NGP flakes/platelets. All processes begin with intercalation and/or oxidation treatment of graphitic materials (e.g. natural graphite particles).

The upper left portion of FIG. 5(A) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 6(A).

In one prior art process, the exfoliated graphite (or mass of graphite worms) is re-compressed by using a calendaring or roll-pressing technique to obtain flexible graphite foils (26 in FIG. 5(A) or 106 in FIG. 5(B)), which are typically 100-300 μm thick. An SEM image of a cross-section of a flexible graphite foil is presented in FIG. 6(B), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). These properties are inadequate for many thermal management applications and the present invention is made to address these issues.

In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 5(B)). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 5(B) having a thickness>100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including discrete sheets/platelets of single-layer and/or few-layer graphene or graphene oxide, 33 in FIG. 5(A)) may be made into a graphene film/paper (34 in FIG. 5(A) or 114 in FIG. 5(B)) using a film- or paper-making process. FIG. 7(B) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections. NGP aggregates, even when being closely packed, exhibit a thermal conductivity higher than 1,000 W/mK only when the film or paper is cast and strongly pressed into a sheet having a thickness lower than 10 µm. A heat spreader in many electronic devices is normally required to be thicker than 10 µm but thinner than 35 µm).

Another graphene-related product is the graphene oxide gel 21 (FIG. 5(A)). This GO gel is obtained by immersing a graphitic material 20 in a powder or fibrous form in a strong oxidizing liquid in a reaction vessel to form a suspension or slurry, which initially is optically opaque and dark. This optical opacity reflects the fact that, at the outset of the oxidizing reaction, the discrete graphite flakes and, at a later stage, the discrete graphene oxide flakes scatter and/or absorb visible wavelengths, resulting in an opaque and generally dark fluid mass. If the reaction between graphite powder and the oxidizing agent is allowed to proceed at a sufficiently high reaction temperature for a sufficient length of time and all the resulting GO sheets are fully separated, this opaque suspension is transformed into a brown-colored and typically translucent or transparent solution, which is now a homogeneous fluid called "graphene oxide gel" (21 in FIG. 5(A)) that contains no discernible discrete graphite flakes or graphite oxide platelets. If dispersed and deposited using the presently invented reverse roll coating, the GO gel undergoes molecular orientation to form a layer of highly oriented GO 35, which can be heat-treated to become a graphitic film 37.

Again, typically, this graphene oxide gel is optically transparent or translucent and visually homogeneous with no discernible discrete flakes/platelets of graphite, graphene, or graphene oxide dispersed therein. In the GO gel, the GO molecules are uniformly "dissolved" in an acidic liquid medium. In contrast, suspension of discrete graphene sheets or graphene oxide sheets in a fluid (e.g. water, organic acid or solvent) look dark, black or heavy brown in color with individual graphene or graphene oxide sheets discernible or recognizable even with naked eyes or using a low-magnification light microscope (100×-1,000×).

Even though graphene oxide suspension or GO gel is obtained from a graphitic material (e.g. powder of natural graphite) having multiple graphite crystallites exhibiting no preferred crystalline orientation, as determined by an X-ray diffraction or electron diffraction method, the resulting graphitic film exhibits a very high degree of preferred crystalline orientation as determined by the same X-ray diffraction or electron diffraction method. This is yet another piece of evidence to indicate that the constituent graphene planes of hexagonal carbon atoms that constitute the particles of the original or starting graphitic material have been chemically modified, converted, re-arranged, re-oriented, linked or cross-linked, merged and integrated, re-graphitized, and even re-crystallized.

Example 1: Preparation of Discrete Oxidized Nano Graphene Platelets (NGPs) or GO Sheets Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, 500 grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight.

The reverse roll transfer procedure was then followed to make the resulting suspension into thin films and thick films of GO, from 1 to 500 µm in thickness, on a polyethylene terephthalate (PET) film. For comparison purposes, GO layers of a comparable thickness range were also prepared by drop-casting and Comma coating techniques.

For making graphitic films, various GO films were subjected to heat treatments that typically involve an initial thermal reduction temperature of 80-350° C. for 1-8 hours, followed by heat-treating at a second temperature of 700-2,850° C.

Figure 14:
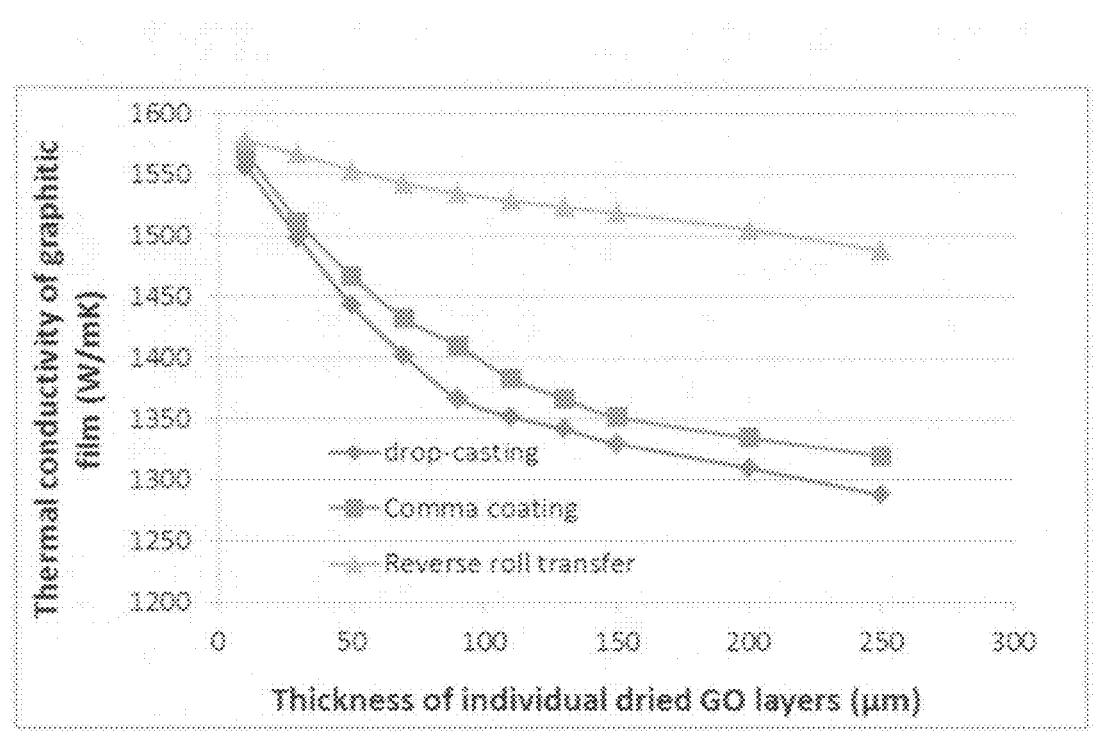
FIG. 14 Thermal conductivity of various graphitic films prepared by drop-casting, comma coating, and reverse roll coating of GO layers treated with a final heat treatment temperature of 1,500° C., plotted as a function of the thickness value of the individual dried GO layers.

The thermal conductivity data of three series of samples prepared by using three coating techniques are summarized in FIG. 14. The data shown in FIG. 14 indicates that a lower thickness value of the GO layers obtained by Comma coating or drop-casting layers (<20 µm each) led to a high in-plane thermal conductivity of the graphitic film prepared with a final heat treatment temperature of 1,500° C. However, the in-plane thermal conductivity rapidly decreases with increasing coating or casting thickness. This is an indication that a high degree of graphene sheet/molecule orientation in a GO film can be achieved only if the film made by drop-casting or comma coating is thin (e.g. 20 µm or less). However, when the film thickness is increased, casting and comma coating lose their ability to induce orientation. In contrast, the thermal conductivity of the graphitic film produced by reverse roll transfer coating is relatively independent of the film thickness. A thermal conductivity as high as 1,488 W/mK is achieved with a graphitic film even as thick as 250 µm. These observations demonstrate the unexpected effectiveness of using the presently invented reverse roll transfer coating approach of producing highly oriented GO layers and the resulting graphitic films. Such a strategy has never been previously taught or suggested.

Example 2: Preparation of Single-Layer Graphene Sheets from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. The suspension was then coated onto a PET polymer surface using a reverse roll transfer coating and separately, a comma coating procedure to form oriented GO films. The resulting GO films, after removal of liquid, have a thickness that can be varied from approximately 0.5 to 500 μm.

Figure 9:
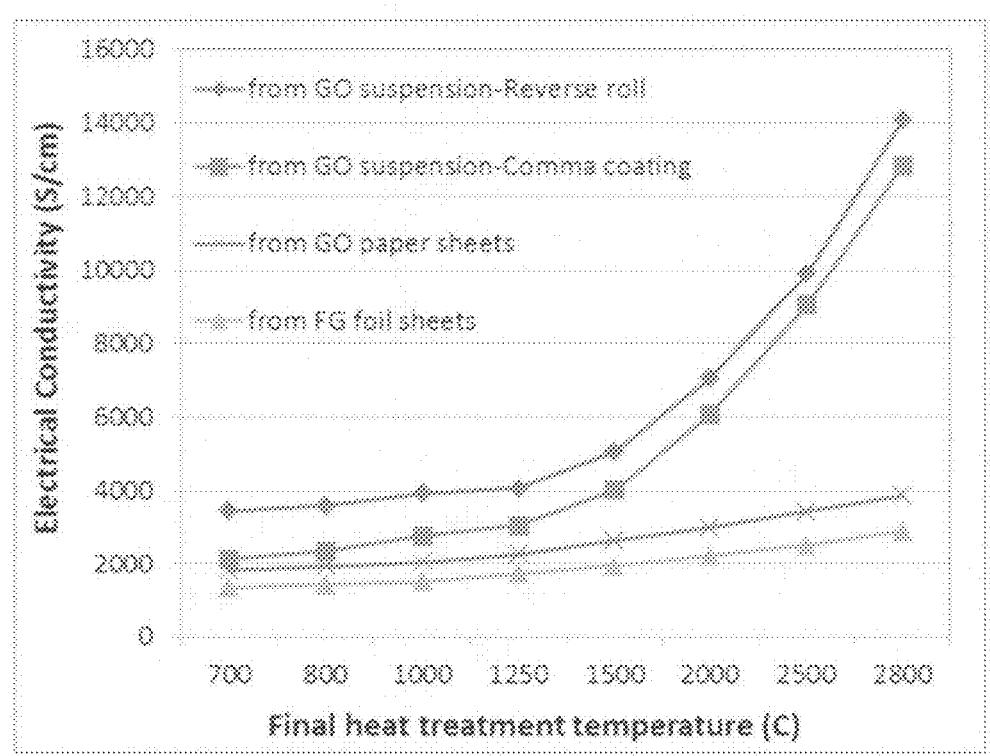

For making graphitic films, the GO films were then subjected to heat treatments that typically involve an initial thermal reduction temperature of 80-500° C. for 1-5 hours, followed by heat-treating at a second temperature of 1,000-2,850° C. The electric conductivity data of the two series of films, each 20 μm thick, are plotted as a function of final heat treatment temperatures, shown in FIG. 9. These data demonstrate that, quite surprisingly, the GO films prepared by reverse roll coating lead to significantly higher thermal conductivity values as compared to those prepared by comma coating. Both comma coating- and reverse roll coating-made thermal films are dramatically more conductive than flexible graphite foil and corresponding reduced GO paper.

Figure 10:
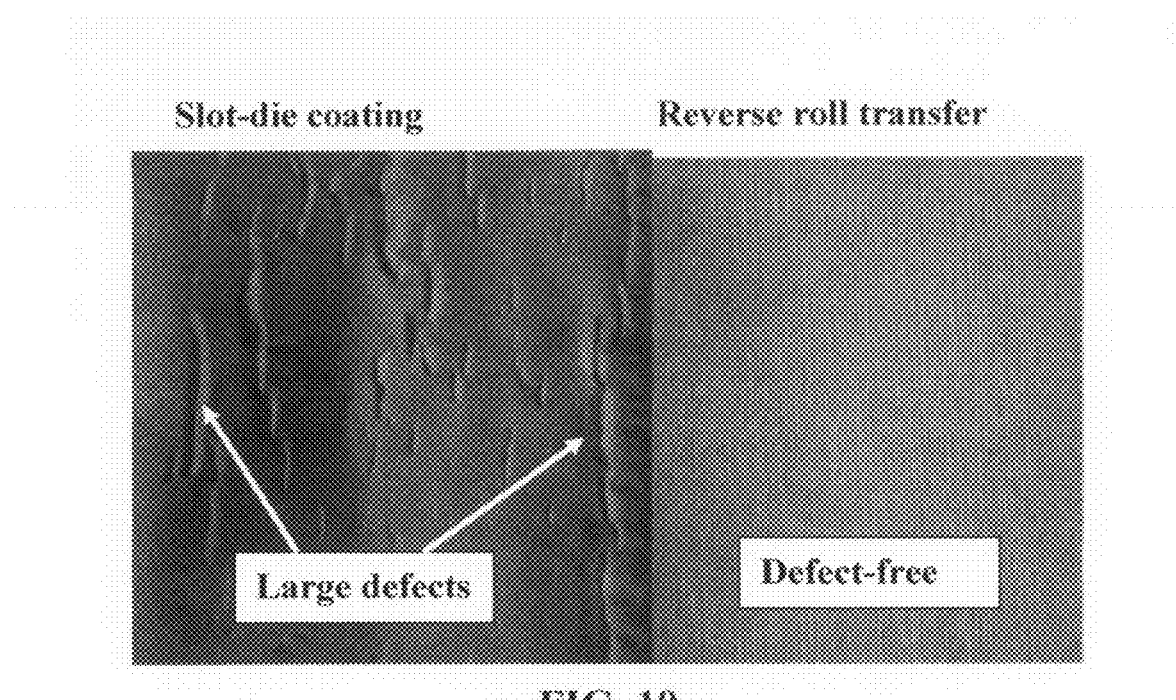
FIG. 10 Photos of highly oriented graphene oxide films prepared by slot-die coating (left image) and by reverse roll transfer procedure (right image), respectively.

In many cases, particularly when the solid content of GO in liquid medium is high (e.g. higher than 3% by weight, or higher than 5%), both slot die and comma coating are not suitable for producing good-quality, uniform-thickness GO films (e.g. left image of FIG. 10). In contrast, reverse roll transfer works very well for a wide range of GO solid contents (e.g. from 0.05% to 25% by weight, more typically from 0.1% to 15%), always producing good-quality GO films (e.g., right image of FIG. 10).

Example 3: Preparation of Graphene Oxide (GO) Suspension and GO Gel from Natural Graphite Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction>3% and typically from 5% to 15%.

For comparison purposes, we also have prepared GO gel samples by extending the oxidation times to approximately 96 hours. With continued heavy oxidation, the dark-colored, opaque suspension obtained with 48 hours of oxidation turns into a brown-yellowish solution that is translucent upon rinsing with some water.

By dispensing and coating the GO suspension or the GO gel on a PET film, using both reverse roll coating and slot-die coating, and removing the liquid medium from the coated film we obtained a thin film of dried graphene oxide. GO films were then subjected to different heat treatments, which typically include a thermal reduction treatment at a first temperature of 100° C. to 500° C. for 1-10 hours, and at a second temperature of 1,000° C.-2,850° C. for 0.5-5 hours. With these heat treatments, also under a compressive stress, the GO film was transformed into a graphitic film. In several samples, the GO gels were aged at 40-55° C. for 24 hours. We have unexpectedly observed that aged samples lead to a higher degree of GO sheet/molecule orientation, lower heat treatment temperatures required, and higher degree of graphene crystal perfection.

Figure 11A:
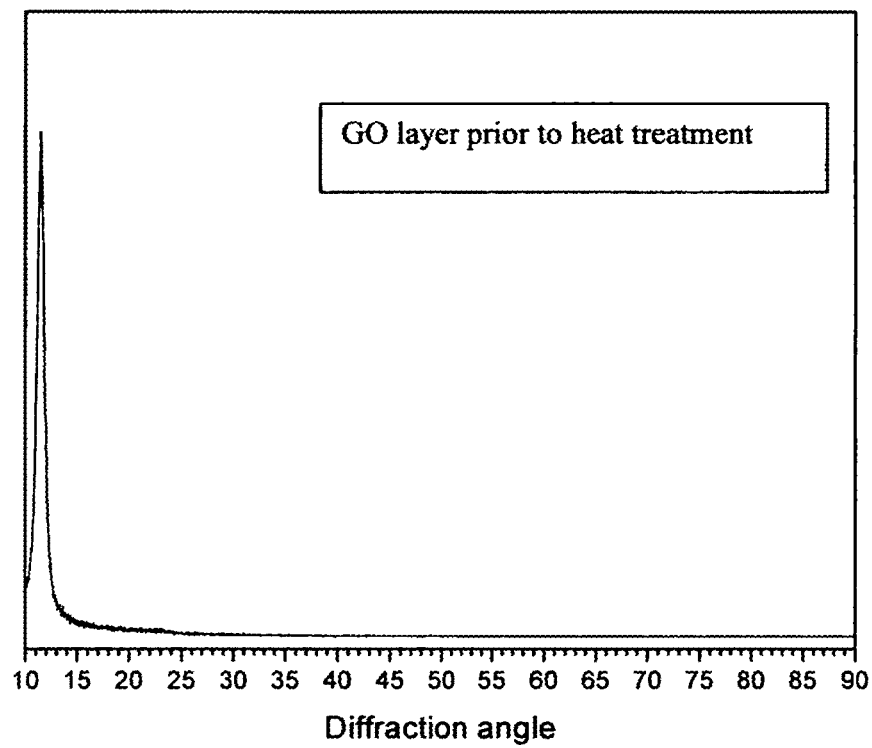
FIG. 11(A) X-ray diffraction curves of a GO layer.
Figure 11B:
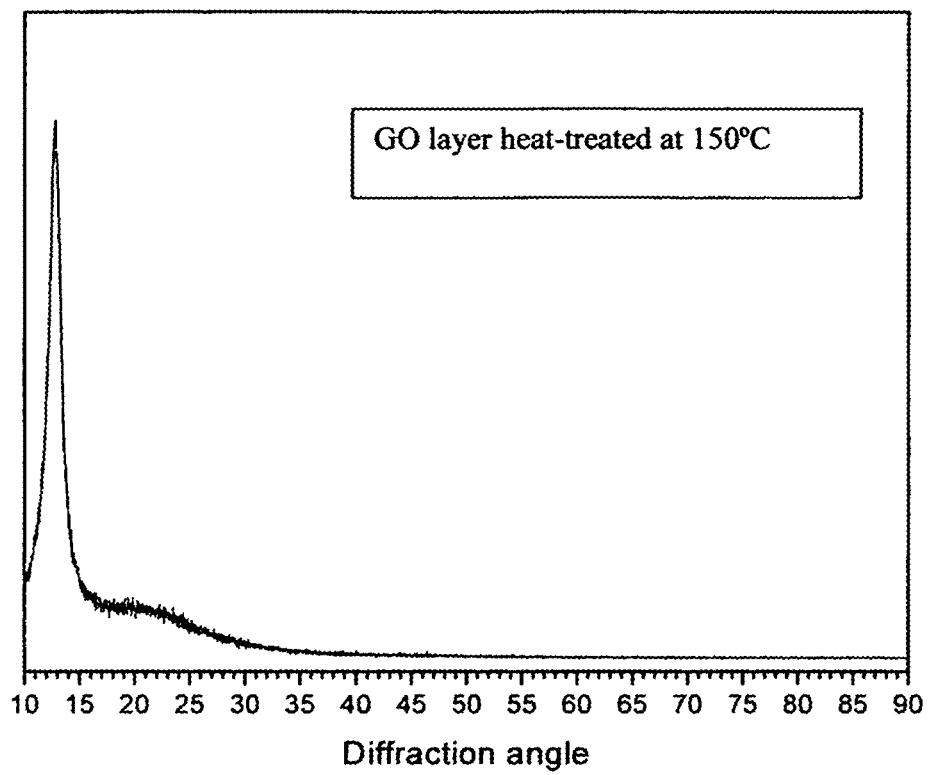
FIG. 11(B) X-ray diffraction curves of GO layer thermally reduced at 150° C. (partially reduced).
Figure 11C:
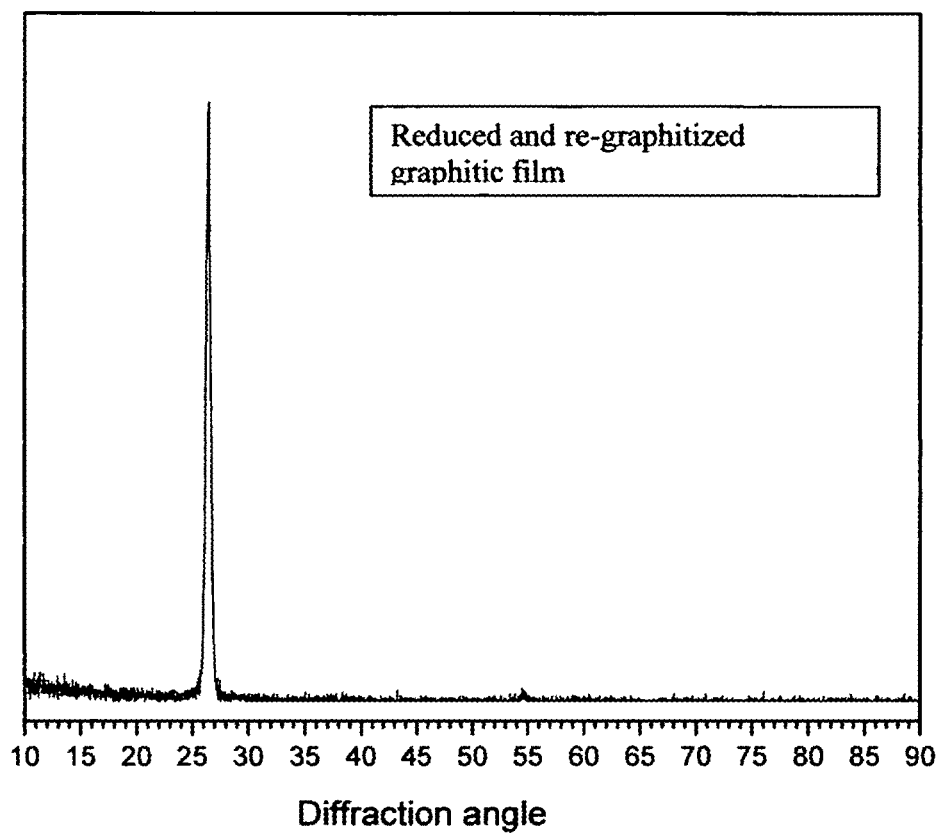
FIG. 11(C) X-ray diffraction curves of reduced and re-graphitized graphitic film.

The internal structures (crystal structure and orientation) of several dried GO layer and the graphitic films at different stages of heat treatments were investigated. X-ray diffraction curves of a layer of dried GO prior to a heat treatment, a GO film thermally reduced at 150° C. for one hour, and a graphitic film are shown in FIG. 11(A), FIG. 11(B), and FIG. 11(C), respectively. The peak at approximately 2θ=12° of the dried GO layer (FIG. 11(A)) corresponds to an inter-graphene spacing ($d_{002}$) of approximately 0.7 nm. With some heat treatment at 150° C., the dried GO compact exhibits the formation of a hump centered at 22° (FIG. 11(B)), indicating that it has begun the process of decreasing the inter-graphene spacing, indicating the beginning of chemical linking and ordering processes. With a heat treatment temperature of 2,500° C. for one hour, the $d_{002}$ spacing has decreased to approximately 0.336, close to 0.3354 nm of a graphite single crystal.

Figure 11D:
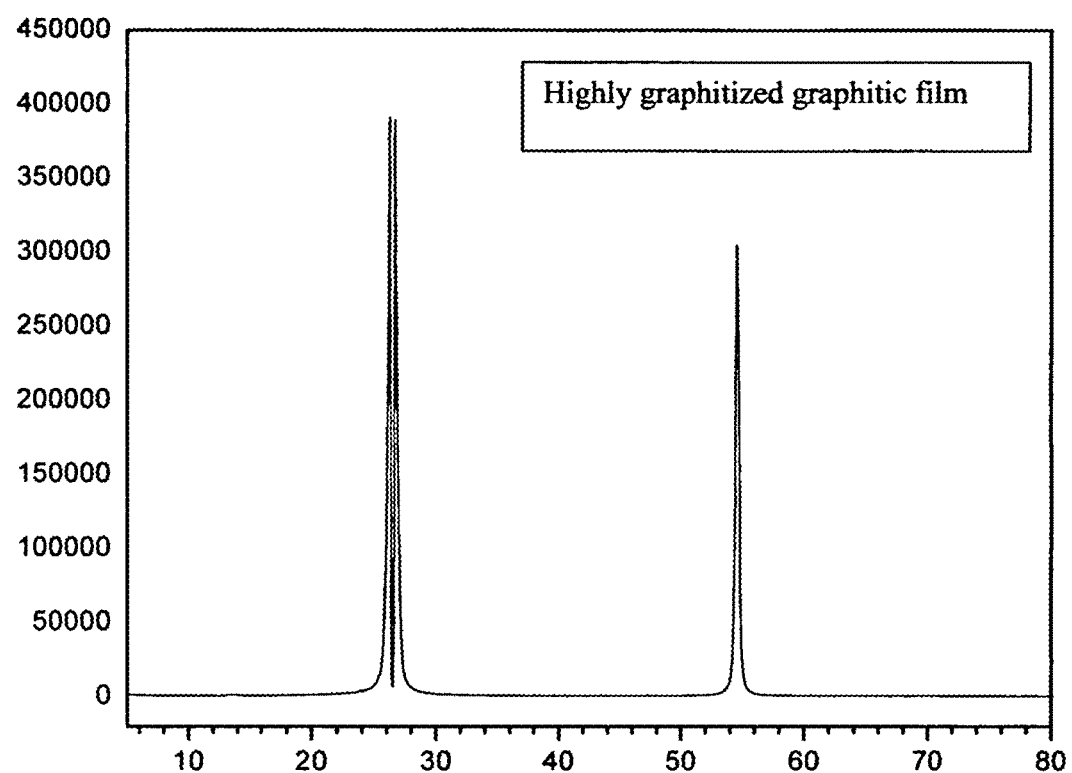
FIG. 11(D) X-ray diffraction curves of highly re-graphitized and re-crystallized graphitic films showing a high-intensity (004) peak.
Figure 11E:
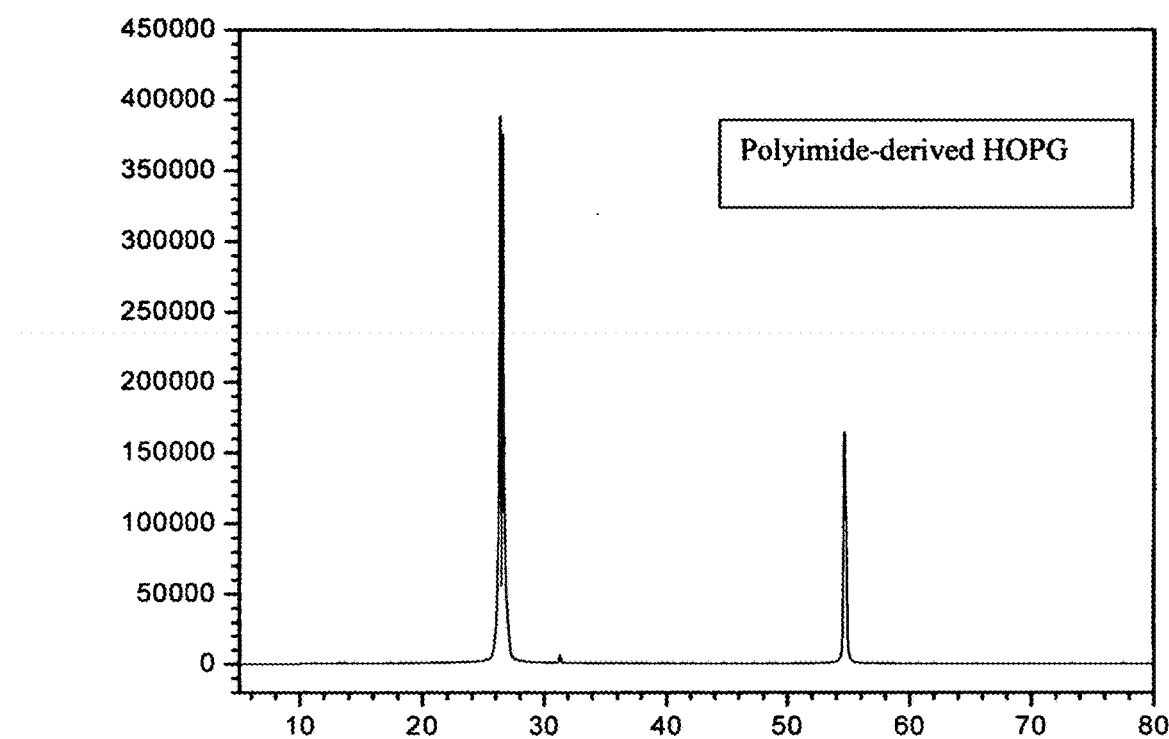
FIG. 11(E) X-ray diffraction curves of a polyimide-derived HOPG with a HTT as high as 3,000° C.

With a heat treatment temperature of 2,750° C. and 2,500 C for slot-die coated and reverse roll coated films, respectively, for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane (FIG. 11(D)). The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. One example is presented in FIG. 11(E) for a polyimide-derived PG with a HTT of 3,000° C. for two hours, which exhibits a I(004)/I (002) ratio of about 0.41. In contrast, a graphitic film prepared with a final HTT of 2,750° C. for one hour exhibits a I(004)/I(002) ratio of 0.78 and a Mosaic spread value of 0.21, indicating a practically perfect graphene single crystal with an exceptional degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphitic films have a mosaic spread value in this range of 0.2-0.4 when produced using a final heat treatment temperature no less than 2,200° C. (reverse roll coating) or no less than 2,500° C. (slot-die coating).

It may be noted that the I(004)/I(002) ratio for all tens of flexible graphite foil compacts investigated are all <<0.05, practically non-existing in most cases. The I(004)/I(002) ratio for all graphene paper/membrane samples prepared with a vacuum-assisted filtration method is <0.1 even after a heat treatment at 3,000° C. for 2 hours. These observations have further confirmed the notion that the presently invented graphitic film is a new and distinct class of material that is fundamentally different from any pyrolytic graphite (PG), flexible graphite (FG), and conventional paper/film/membrane of graphene/GO/RGO sheets/platelets (NGPs).

Figure 12A:
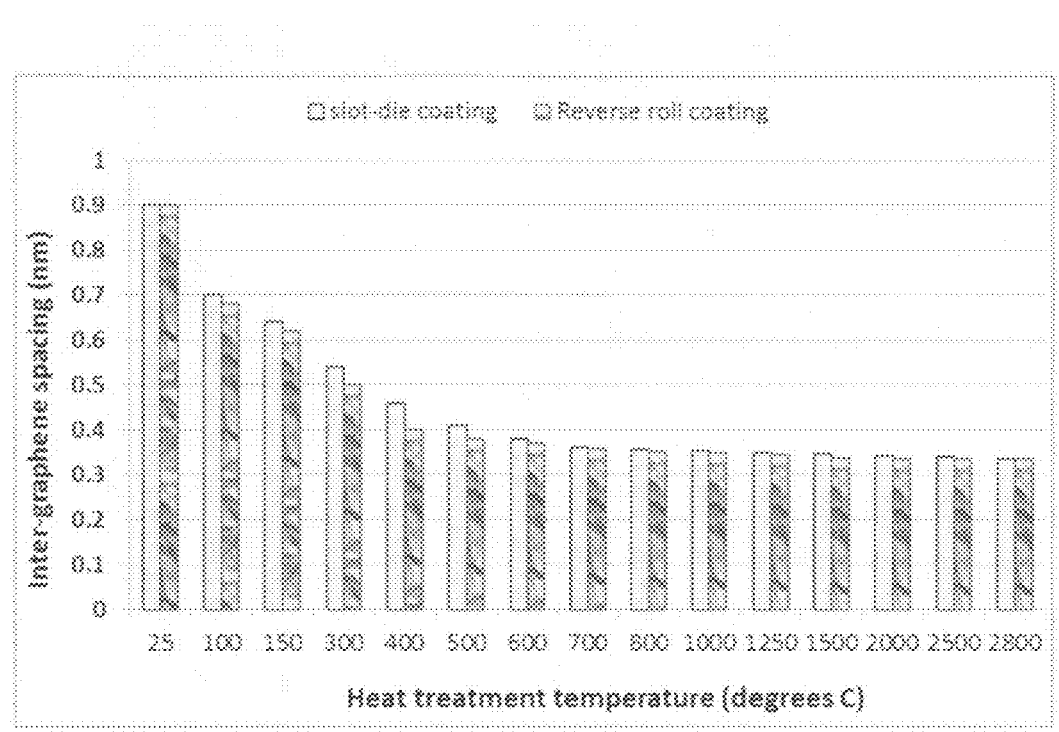
FIG. 12(A) Inter-graphene plane spacing, measured by X-ray diffraction, of reverse roll-coated GO film- and slot die-coated GO film-derived graphitic films plotted as a function of the heat treatment temperature.
Figure 12B:
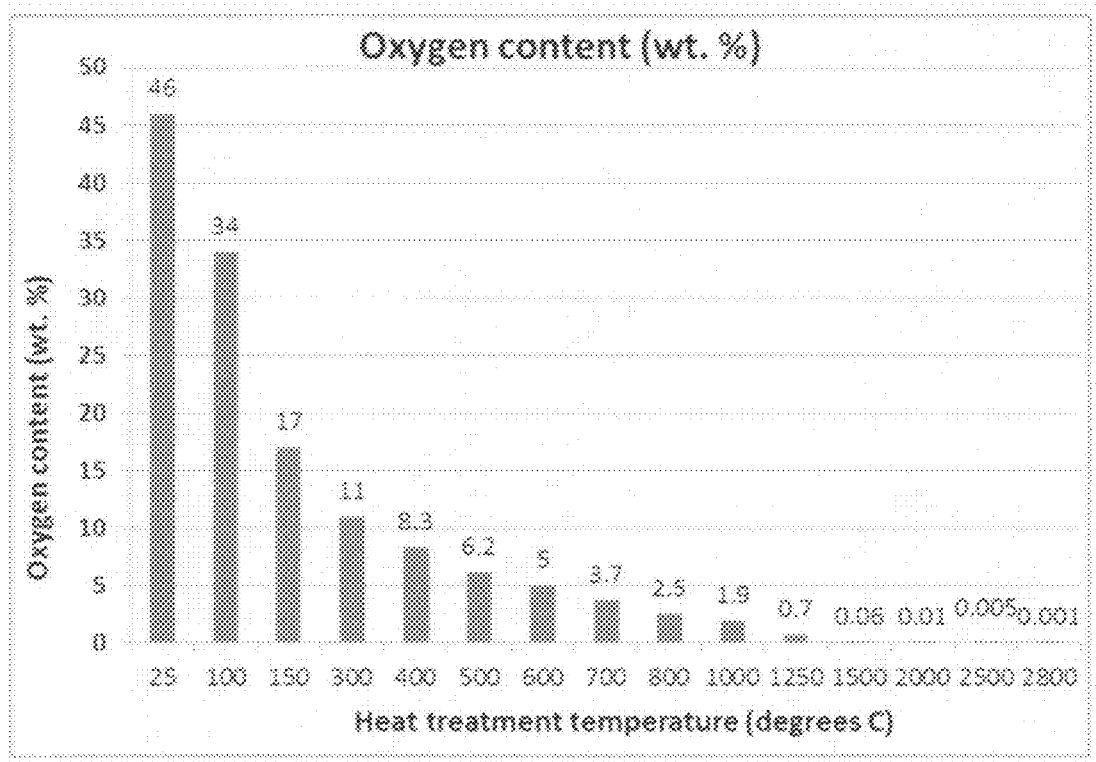
FIG. 12(B) Oxygen content in the GO suspension-derived graphitic films.
Figure 12C:
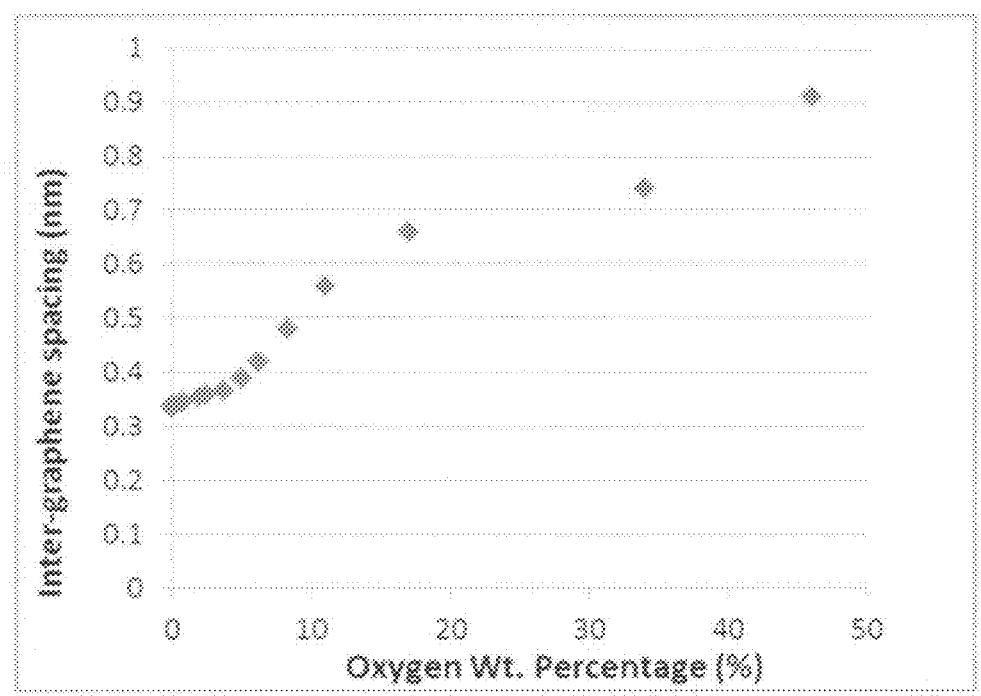
FIG. 12(C) Correlation between inter-graphene spacing and the oxygen content.
Figure 12D:
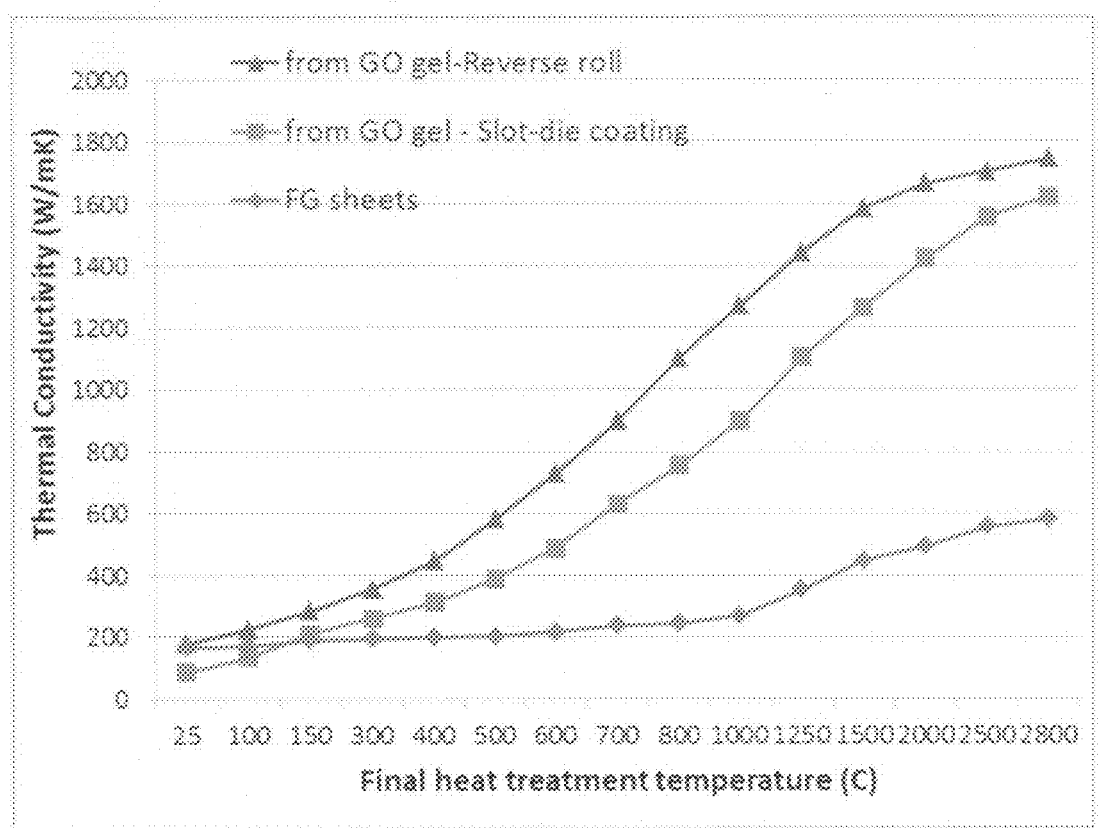
FIG. 12(D) The thermal conductivity of reverse roll-coated GO gel-derived graphitic films, slot die-coated GO gel-derived graphitic films, and flexible graphite (FG) foil, all plotted as a function of the final heat treatment temperature.

The inter-graphene spacing values of both the GO suspension- and GO gel-derived graphitic film samples obtained by heat treating at various temperatures over a wide temperature range are summarized in FIG. 12(A). Corresponding oxygen content values in the GO suspension-derived unitary graphene layer are shown in FIG. 12(B). In order to show the correlation between the inter-graphene spacing and the oxygen content, the data in FIGS. 12(A) and 12(B) are re-plotted in FIG. 12(C). The thermal conductivity of the GO gel-derived graphitic film specimens (prepared by reverse roll and slot-die coating) and the corresponding sample of flexible graphite (FG) foil sheets, also plotted as a function of the same final heat treatment temperature range, are summarized in FIG. 12(D). All these samples have comparable thickness values. These data again demonstrate the surprising superiority of the reverse roll coating technique, in comparison with other coating or thin film production procedures, in inducing a high degree of orientation in GO films and facilitating the growth and perfection of graphene crystals.

It is of significance to point out that a heat treatment temperature as low as 400° C. is sufficient to bring the average inter-graphene spacing in reverse roll-coated GO layer to below 0.4 nm (vs. 500° C. of slot die-coated GO), getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes now being larger in lateral dimensions (significantly larger than the length and width of the graphene planes in the original graphite particles) and essentially parallel to one another. This has given rise to a thermal conductivity already >600 W/mK (with a HTT of 500° C.) and >900 W/mk with a HTT of 700° C.), which is more than 3- to 4-fold greater than the value (200 W/mK) of the corresponding flexible graphite foil. These planar GO molecules are derived from the graphene planes that constitute the original structure of starting natural graphite particles (used in the procedure of graphite oxidation to form the GO sheets). The original natural graphite particles, when randomly packed into an aggregate or "graphite compact", would have their constituent graphene planes randomly oriented, exhibiting relatively low thermal conductivity and having essentially zero strength (no structural integrity). In contrast, the tensile strength of the graphitic film samples (even without an added reinforcement) can reach 135 MPa.

With a HTT as low as 800° C., the resulting graphitic films exhibit a thermal conductivity of 1,100 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented graphitic films deliver a thermal conductivity of 1,745 W/mK (FIG. 12(D)).

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

Figure 6A:
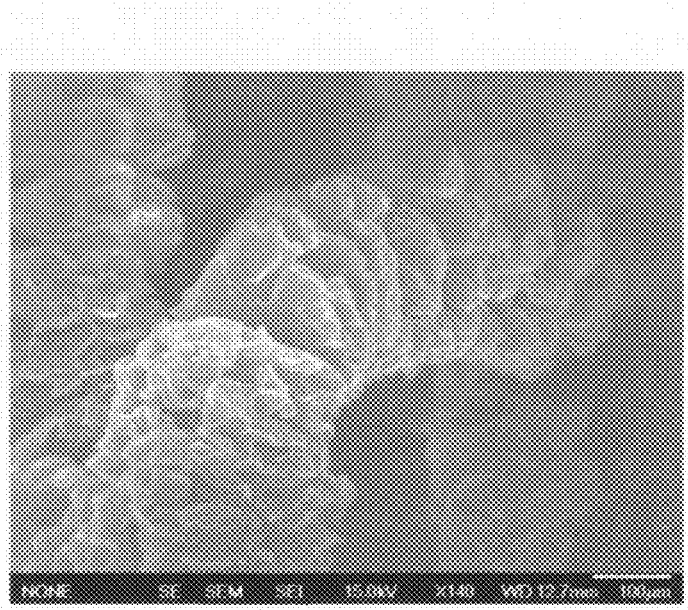
FIG. 6(A) A SEM image of a graphite worm sample after thermal exfoliation of graphite intercalation compounds (GICs) or graphite oxide powders.
Figure 6B:
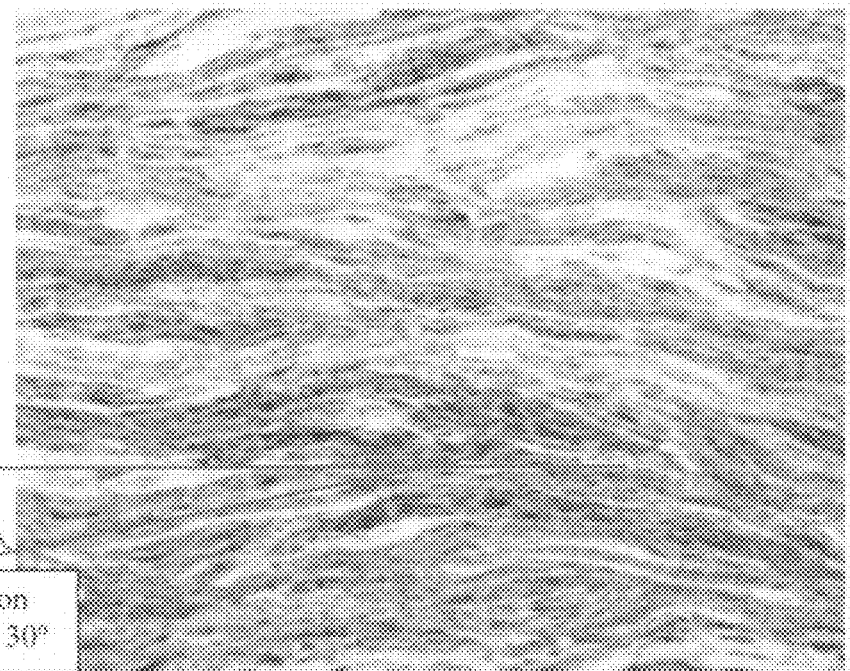
FIG. 6(B) An SEM image of a cross-section of a flexible graphite foil, showing many graphite flakes with orientations not parallel to the flexible graphite foil surface and also showing many defects, kinked or folded flakes.
Figure 7A:
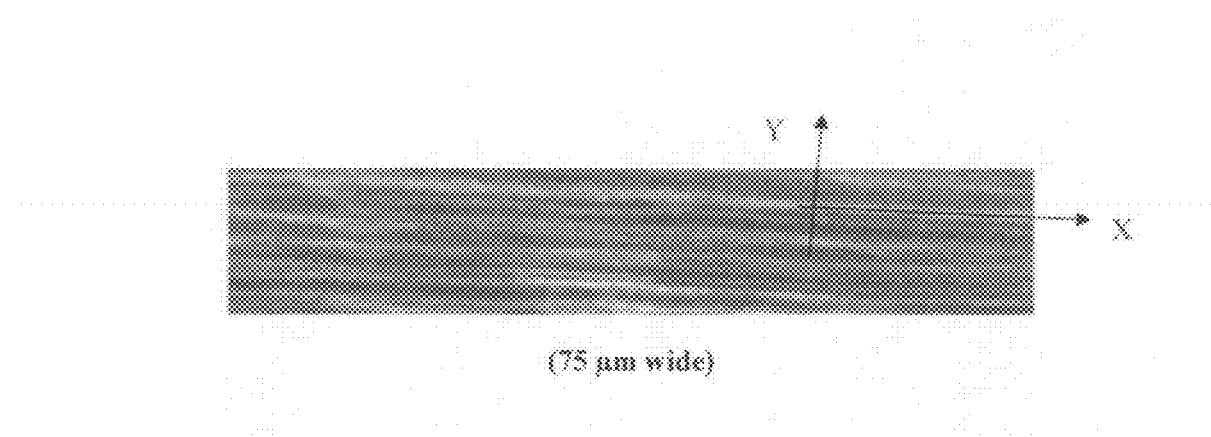
FIG. 7(A) A SEM image of a GO-derived graphitic film, wherein multiple graphene planes (having an initial length/width of 30 nm-300 nm in original graphite particles) have been oxidized, exfoliated, re-oriented, and seamlessly merged into continuous-length graphene sheets or layers that can run for tens of centimeters wide or long (only a 50 μm width of a 10-cm wide graphitic film being shown in this SEM image).
Figure 7B:
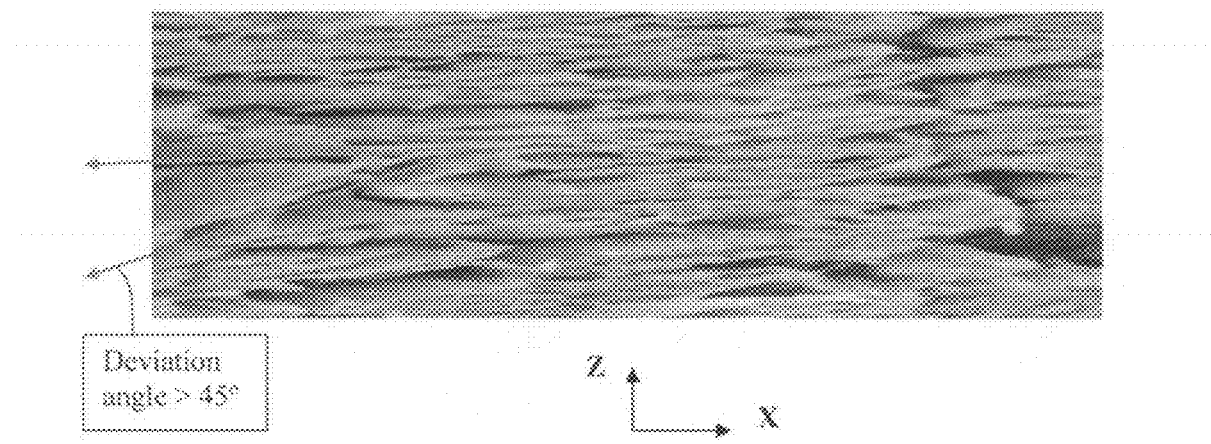
FIG. 7(B) A SEM image of a cross-section of a conventional graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections.

A close scrutiny and comparison of FIG. 6(A), FIG. 7(A), and FIG. 7(B) indicates that the graphene layers in a graphitic film are substantially oriented parallel to one another; but this is not the case for flexible graphite foils and graphene oxide paper. The inclination angles between two identifiable layers in the graphitic film are mostly less than 5 degrees. In contrast, there are so many folded graphite flakes, kinks, and mis-orientations in flexible graphite that many of the angles between two graphite flakes are greater than 10 degrees, some as high as 45 degrees (FIG. 6(B)). Although not nearly as bad, the mis-orientations between graphene platelets in NGP paper (FIG. 7(B)) are also high (average>>10-20°) and there are many gaps between platelets. The graphitic film is essentially gap-free.

Figure 8A:
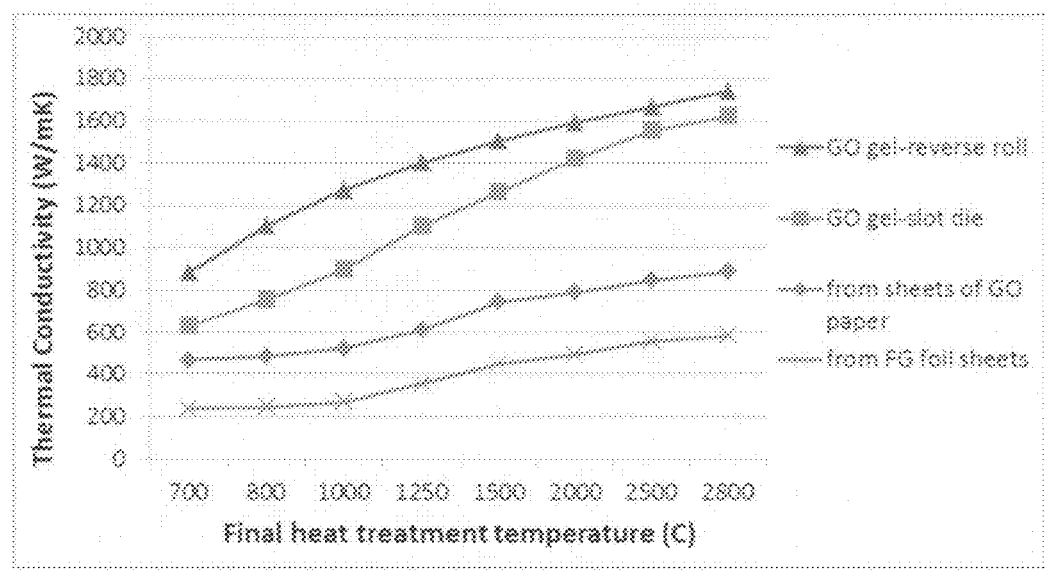
FIG. 8(A) Thermal conductivity values of the GO gel-derived graphitic film (reverse roll transfer), GO gel-derived graphitic film (slot-die coating), sheets of GO platelet paper, and sheets of FG foil plotted as a function of the final heat treatment temperature.

FIG. 8(A) shows the thermal conductivity values of the GO suspension-derived graphitic films (reverse roll-coated) (♦), GO suspension-derived graphitic film (slot die-coated) (■), GO platelet paper (▲) prepared by vacuum-assisted filtration of RGO, and FG foil (x), respectively, all plotted as a function of the final HTT for graphitization or re-graphitization. These data, along with data in FIG. 9 and FIG. 12(D), have clearly demonstrated the superiority of the graphitic film structures produced by reverse roll coating and subsequent heat treating in terms of the achievable thermal conductivity at a given heat treatment temperature.

1) All the prior art work on the preparation of paper or membrane from pristine graphene or graphene oxide sheets/platelets follows distinctly different processing paths, leading to a simple aggregate or stack of discrete graphene/GO/RGO platelets. These simple aggregates or stacks exhibit many folded graphite flakes, kinks, gaps, and mis-orientations, resulting in poor thermal conductivity, low electrical conductivity, and weak mechanical strength.

As shown in FIG. 8(A), even at a heat treatment temperature as high as 2,800° C., the sheets of GO platelet paper exhibits a thermal conductivity less than 900 W/mK, much lower than the >1,730 W/mK of the GO-derived graphitic films.

2) The reverse roll-coated GO-derived graphitic films are superior to the slot die- or comma-coated GO-derived graphitic films in thermal conductivity obtained at comparable final heat treatment temperatures.

3) For comparison, we have also obtained conventional highly oriented pyrolytic graphite (HOPG) samples from both the CVD carbon film route and the polyimide (PI) carbonization route. The CVD carbon was obtained at 1,100° C. on a Cu substrate. The polyimide films were carbonized at 500° C. for 1 hour and at 1,000° C. for 3 hours in an inert atmosphere. Both the CVD carbon films and carbonized PI films were then graphitized at a temperature in the range of 2,500-3,000° C., under a compressive force, for 1 to 5 hours to form a conventional HPOG structure. The CVD carbon-derived HOPG was very thin (<less than 1 μm in thickness) due to the limitation of the CVD process. Other samples were all approximately 300 μm thick.

Figure 8B:
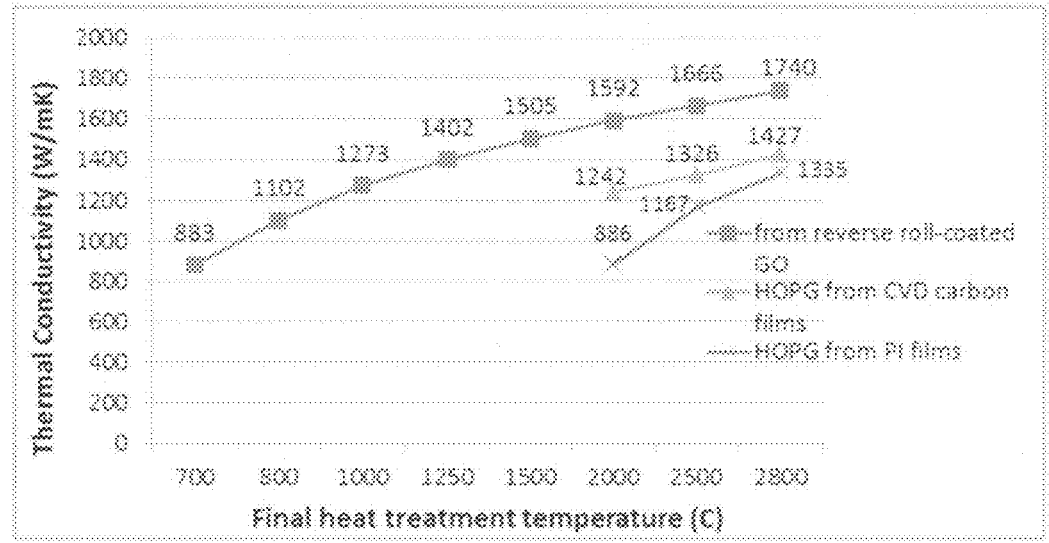
FIG. 8(B) Thermal conductivity values of the GO gel-derived graphitic film (reverse roll transfer), CVD carbon-derived highly oriented pyrolytic graphite (HOPG), and PI-derived thermal films all plotted as a function of the final heat treatment temperature FIG. 9 Thermal conductivity values of the GO dispersion-derived graphitic film (reverse roll transfer), GO dispersion-derived graphitic film (comma coating), sheets of GO platelet paper, and sheets of FG foil plotted as a function of the final heat treatment temperature.

FIG. 8(B) shows the thermal conductivity values of the GO suspension-derived graphitic films (■), the CVD carbon-derived HOPG (▲), and the polyimide-derived HOPG heat-treated for three hours (x) under compression, all plotted as a function of the final graphitization or re-graphitization temperature. These data show that the conventional HOPG, produced by either CVD or carbonized polyimide (PI) route, exhibits a consistently lower thermal conductivity as compared to the GO suspension-derived HOGF (■), given the same HTT for the same length of heat treatment time. For instance, the HOPG from PI exhibits a thermal conductivity of 886 W/mK after a graphitization treatment at 2,000° C. for 3 hours. At the same final graphitization temperature, the presently invented graphitic film exhibits a thermal conductivity value of 1,592 W/mK. That the CVD carbon-derived HOPG shows a higher thermal conductivity value compared to the corresponding PI-derived HOPG might be due to the shear low thickness of CVD film that was easier to achieve higher orientation as compared to PI.

4) These observations have demonstrated a clear and significant advantage of using the reverse roll-coated GO gel approach to producing graphitic films versus the conventional PG approach to producing oriented graphite crystals. As a matter of fact, no matter how long the graphitization time is for the HOPG, the thermal conductivity is always lower than that of a GO gel-derived graphitic film. In other words, the presently invented graphitic film is fundamentally different and patently distinct from the flexible graphite (FG) foil, graphene/GO/RGO paper/membrane, and pyrolytic graphite (PG) in terms of chemical composition, crystal and defect structure, crystal orientation, morphology, process of production, and properties.

Example 4: Preparation of Pristine Graphene Sheets/Platelets (0% Oxygen) and the Effect of Pristine Graphene Sheets Recognizing the possibility of the high defect population in GO sheets acting to reduce the conductivity of individual graphene planes, we decided to study if the use of pristine graphene sheets (non-oxidized and oxygen-free) can lead to a graphitic film having a higher thermal conductivity. Pristine graphene sheets were produced by using the direct ultrasonication process, also known as the liquid-phase production process.

In a typical direct ultrasonication procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Various amounts of pristine graphene sheets were added to GO suspensions to obtain mixture suspensions wherein GO and pristine graphene sheets are dispersed in a liquid medium. The same procedure was then followed to produce graphitic film samples of various pristine graphene proportions. The thermal conductivity data of these samples are summarized in FIG. 15, which indicate that the thermal conductivity of the graphitic films produced from pure pristine graphene sheets (presumably themselves being highly conducting) is surprisingly lower than that of the graphitic films from GO sheets (of low conductivity due to high defect population on graphene planes). SEM examination of the samples indicates that the pristine graphene sheet-derived graphitic films has poor graphene sheet orientation and has many graphene sheet kinks and foldings.

Further surprisingly, there are synergistic effects that can be observed when both the pristine graphene sheets and GO sheets co-exist in proper proportions. It seems that GO can help pristine graphene sheets get dispersed well in a suspension and get them better oriented when being coated or cast into thin films. Yet, the high conductivity of pristine graphene sheets, when properly oriented, helps the resulting HOGF achieve a higher over-all conductivity.

Figure 15:
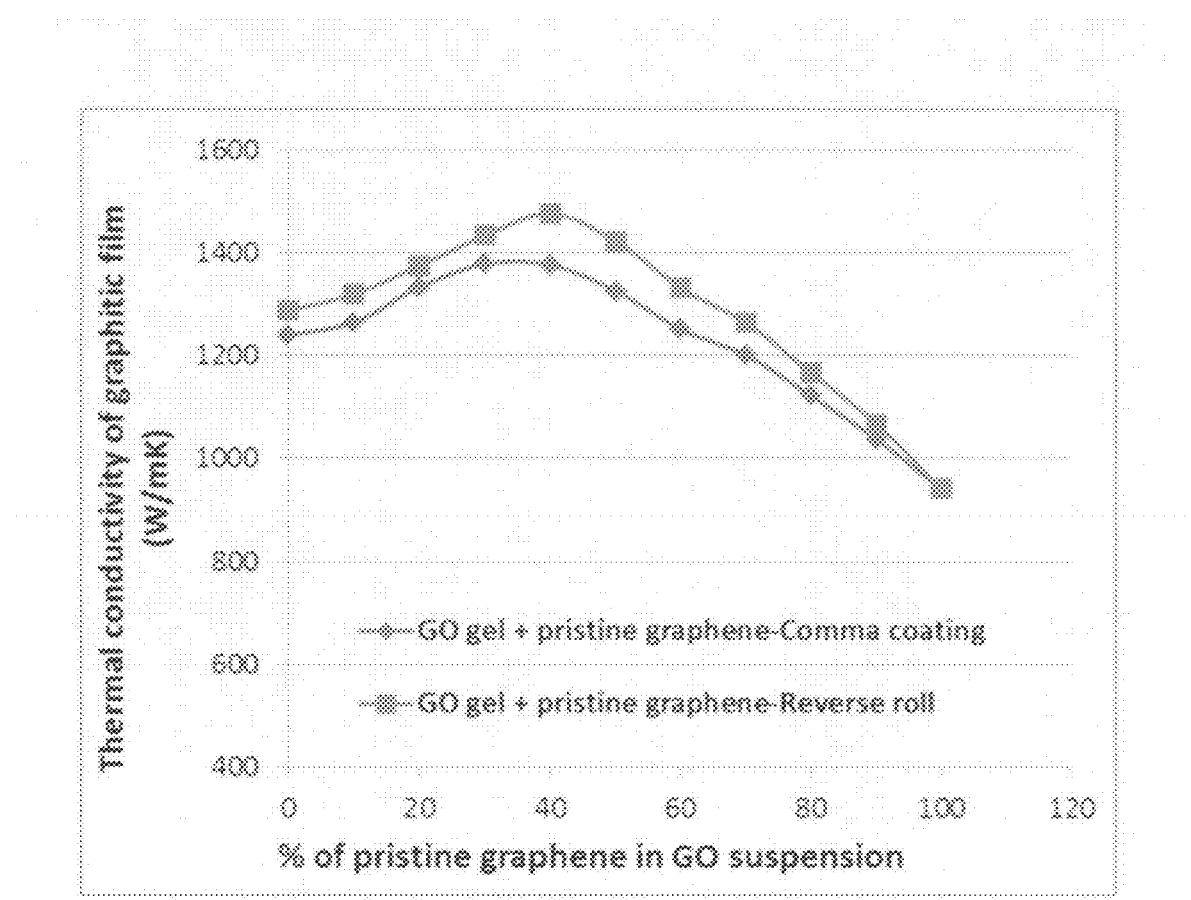
FIG. 15 Thermal conductivity of graphitic films prepared from comma-coated layers and reverse roll-coated layers heat-treated with a final heat treatment temperature of 1,000° C. and a final thickness of approximately 50 μm, plotted as a function of the proportion of pristine graphene sheets in a GO suspension.

Furthermore, these data in FIG. 15 also show that the reverse roll coating is also more effective than comma coating in creating GO orientation even for mixtures of GO and pristine graphene sheets. This is another unexpected result.

Examples 5: Tensile Strength of Various Graphene Oxide-Derived Graphitic Films

Figure 13A:
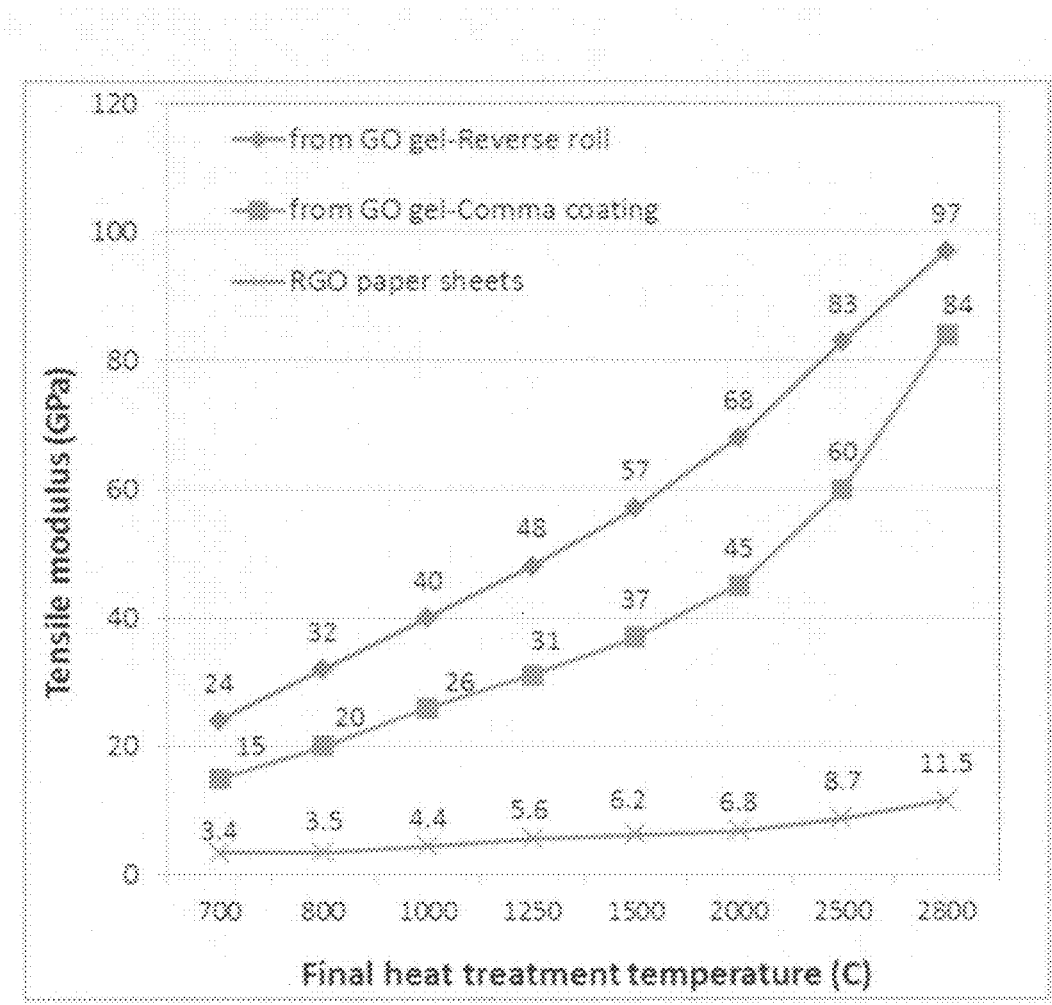
FIG. 13(A) Tensile strength of the graphitic films from reverse roll-coated GO films, slot die-coated GO films, and RGO platelet paper.
Figure 13B:
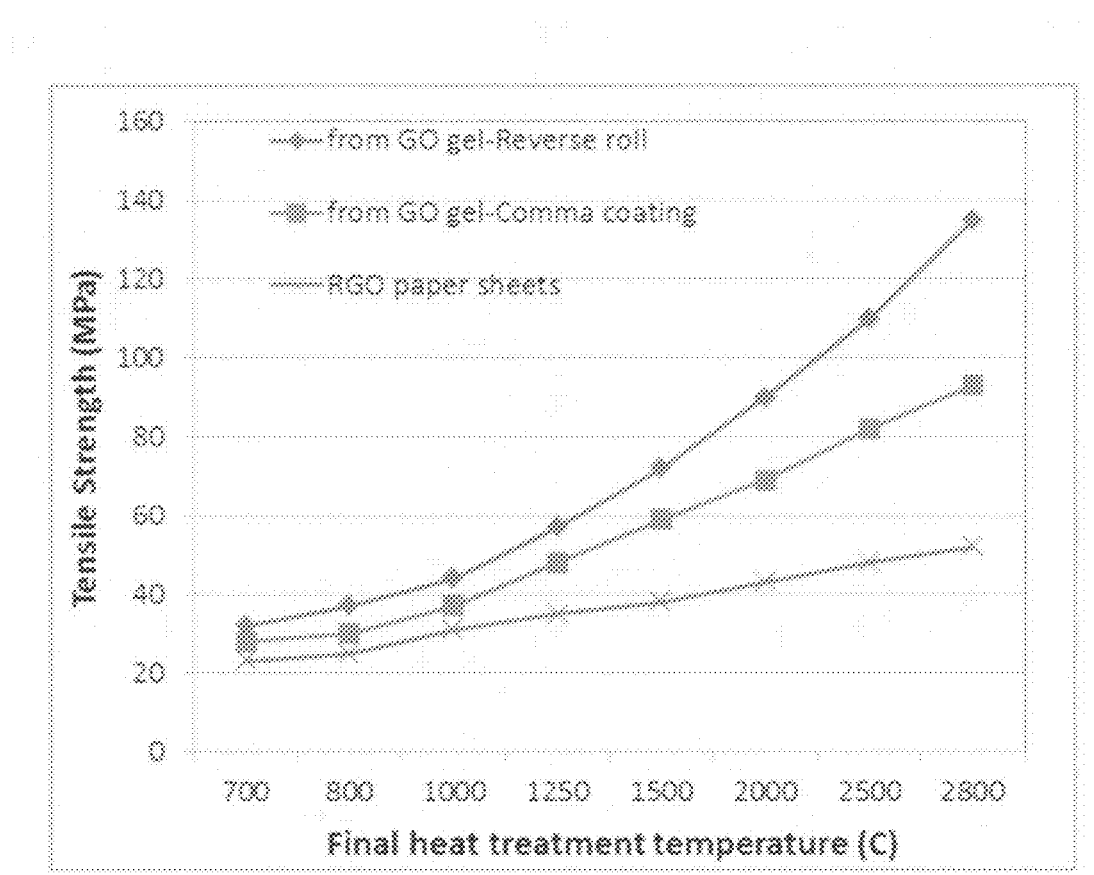
FIG. 13(B) Tensile modulus of the graphitic films from reverse roll-coated GO films, slot die-coated GO films, and RGO platelet paper.

A series of reverse roll-coated GO gel-derived graphitic films, Comma coated GO gel-derived graphitic films, and sheets of RGO platelet paper were prepared by using a comparable final heat treatment temperature for all materials. A universal testing machine was used to determine the tensile properties of these materials. The tensile modulus and strength of the graphitic film samples from reverse roll-coated GO gel, those from comma-coated GO gel, and RGO platelet paper, over a range of heat treatment temperatures are shown in FIG. 13(A) and FIG. 13(B), respectively.

Figure 7C:
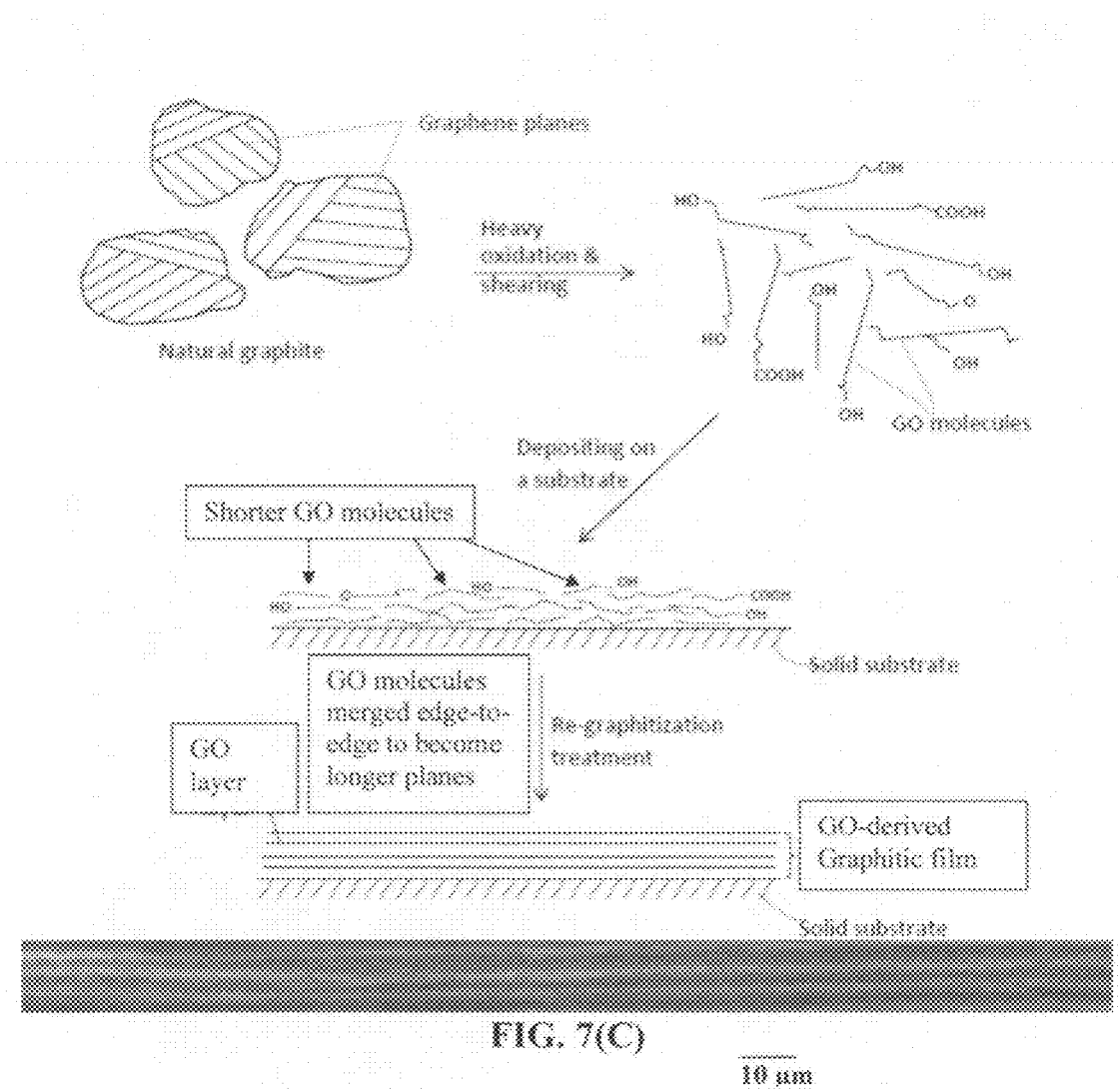
FIG. 7(C) Schematic drawing and an attendant SEM image to illustrate the formation process of a HOGF that is composed of multiple graphene planes that are parallel to one another and are chemically bonded in the thickness-direction or crystallographic c-axis direction.
Figure 7D:
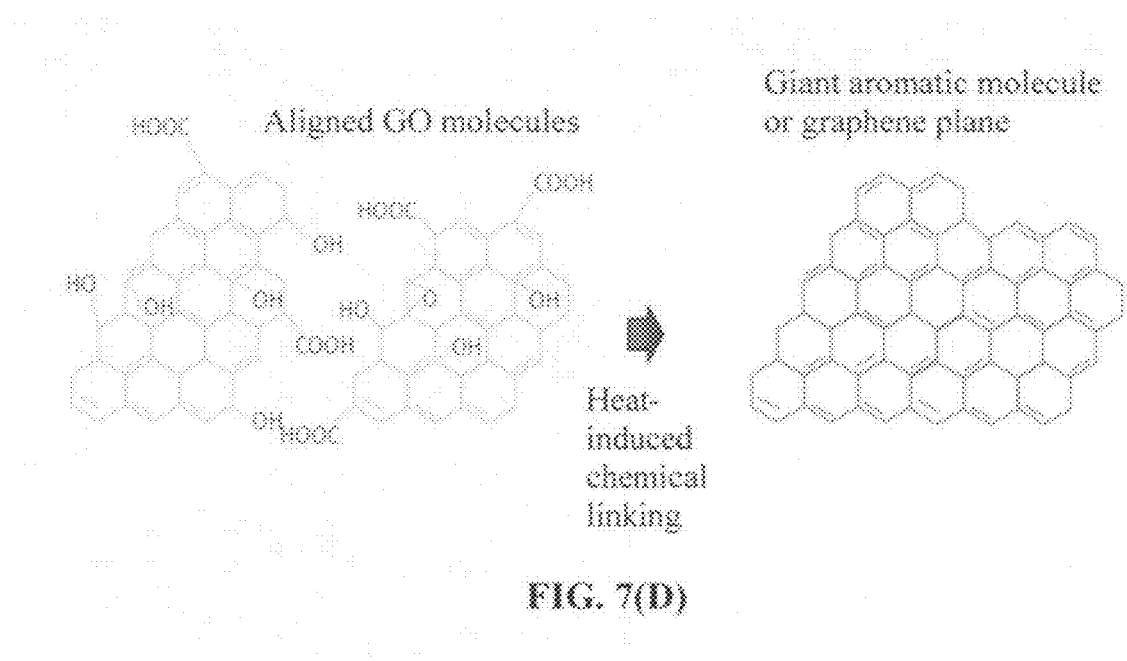
FIG. 7(D) One plausible chemical linking mechanism (only 2 GO molecules are shown as an example; a large number of GO molecules can be chemically linked together to form a graphene layer).

These data have demonstrated that the tensile strength of the RGO paper increases from 23 to 52 MPa when the final heat treatment temperature increases from 700 to 2,800° C. In contrast, the tensile strength of the comma-coated GO gel-derived graphitic films increases significantly from 30 to >93 MPa over the same range of heat treatment temperatures. Most dramatically, the tensile strength of the reverse roll GO gel-derived graphitic films increases significantly from 32 to >135 MPa. This result is quite striking and further reflects the notion that the GO gel-derived GO layers contain highly live and active GO sheets or molecules during the heat treatment that are capable of chemical linking and merging with other plate-like molecules in an edge-to-edge manner (as illustrated in FIG. 7(C) and FIG. 7(D)), while the graphene platelets in the conventional RGO paper are essentially "dead" platelets. Clearly, the GO-derived graphitic film is a new class of material by itself.

In summary, the graphene oxide suspension- or GO gel-derived graphitic films, made by reverse roll transfer coating followed by heat treatments, have the following characteristics:

(1) The graphitic films (thin or thick) are an integrated graphene oxide or essentially oxygen-free graphene structure that is typically a poly-crystal having large grains. The graphitic film has wide or long chemically bonded graphene planes that are all essentially oriented parallel to one another. In other words, the crystallographic c-axis directions of all the constituent graphene planes in all grains are essentially pointing in the same direction.

(2) Unexpectedly, the reverse roll coating is significantly more effective than other coating or casting techniques in achieving a higher degree of graphene plane orientation and graphene crystal perfection.

(3) The co-existence of pristine graphene sheets and GO sheets (or molecules) leads to unexpected synergistic effect in producing highly conducting graphitic films.

(4) The graphitic film is a fully integrated, essentially void-free, single graphene entity or monolith containing no discrete flakes or platelets that were previously present in the original GO suspension. In contrast, the paper-like sheets of exfoliated graphite worms (i.e., flexible graphite foils), mats of expanded graphite flakes (each flake>100 nm in thickness), and paper or membrane of graphene or GO platelets (each platelet<100 nm) are a simple, un-bonded aggregate/stack of multiple discrete graphite flakes or discrete platelets of graphene, GO, or RGO. The flakes or platelets in these paper/membrane/mats are poorly oriented and have lots of kinks, bends, and wrinkles. Many voids or other defects are present in these paper/membrane/mats.

(5) In prior art processes, discrete graphene sheets (<<100 nm, typically <10 nm) or expanded graphite flakes (>100 nm) that constitute the original structure of graphite particles could be obtained via expanding, exfoliating, and separating treatments. By simply mixing and re-compressing these discrete sheets/flakes into a bulk object, one could attempt to orient these sheets/flakes hopefully along one direction through compression. However, with these conventional processes, the constituent flakes or sheets of the resulting aggregate would remain as discrete flakes/sheets/platelets that can be easily discerned or clearly observed even with an un-assisted eye or under a low-magnification optical microscope (×100-×1000).

In contrast, the preparation of the presently invented graphitic films involves heavily oxidizing the original graphite particles, to the extent that practically every one of the original graphene planes has been oxidized and isolated from one another to become individual molecules that possess highly reactive functional groups (e.g. —OH, >O, and —COOH) at the edge and, mostly, on graphene planes as well. These individual hydrocarbon molecules (containing elements such as O and H, in addition to carbon atoms) are dispersed in a liquid medium (e.g. mixture of water and alcohol) to form a GO dispersion. This dispersion is then reverse roll-coated onto a smooth substrate surface, and the liquid components are then removed to form a dried GO layer. When heated, these highly reactive molecules react and chemically join with one another mostly in lateral directions along graphene planes (in an edge-to-edge manner to increase the length and width) and, in some cases, between graphene planes as well.

Illustrated in FIG. 7(D) is a plausible chemical linking mechanism where only 2 aligned GO molecules are shown as an example, although a large number of GO molecules can be chemically linked together to form a graphitic film. Further, chemical linking could also occur face-to-face, not just edge-to-edge. These linking and merging reactions proceed in such a manner that the molecules are chemically merged, linked, and integrated into one single entity. The molecules or "sheets" become dramatically longer and wider. The molecules (GO sheets) completely lose their own original identity and they no longer are discrete sheets/platelets/flakes. There is only one single layer-like structure that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if heat-treated at a higher temperature (e.g. >1,000° C. or much higher), these graphene planes are essentially bonded together with one another along the length or width direction and aligned parallel to one another.

In-depth studies using a combination of SEM, TEM, selected area diffraction, X-ray diffraction, AFM, Raman spectroscopy, and FTIR indicate that the graphitic film is composed of several huge graphene planes (with length/width typically >>100 µm, more typically >>1 mm, and some being >>1 cm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,000° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(6) This graphitic film is not made by gluing or bonding discrete flakes/platelets together with a resin binder, linker, or adhesive. Instead, GO sheets (molecules) in the GO dispersion or GO gel are merged through joining or forming of covalent bonds with one another, into an integrated graphene entity, without using any externally added linker or binder molecules or polymers. These GO molecules are "living" molecules capable of linking with one another in a way similar to living polymers chains undergoing "recombination" (e.g. a living chain of 1,000 monomer units and another living chain of 2,000 monomer units combine or join to become a polymer chain of 3,000 units). A 3,000-unit chain can combine with a 4,000-unit chain to become a giant chain of 7,000 units, and so on.

(7) This graphitic film is typically a poly-crystal composed of large grains having incomplete grain boundaries, typically with the crystallographic c-axis in all grains being essentially parallel to each other. This entity is derived from a GO suspension or GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon heavy oxidation, these initially discrete graphite particles are chemically transformed into highly aromatic graphene oxide molecules having a significant concentration of edge- or surface-borne functional groups (e.g. —OH, —COOH, etc.). These aromatic GO molecules in the GO suspension have lost their original identity of being part of a graphite particle or flake. Upon removal of the liquid component from the suspension, the resulting GO molecules form an essentially amorphous structure. Upon heat treatments, these GO molecules are chemically merged and linked into a unitary or monolithic graphene entity that is highly ordered.

The resulting unitary graphene entity typically has a length or width significantly greater than the $L_a$ and $L_b$ of the original crystallites. The length/width of this graphitic film is significantly greater than the $L_a$ and $L_b$ of the original crystallites. Even the individual grains in a poly-crystalline graphitic film have a length or width significantly greater than the $L_a$ and $L_b$ of the original crystallites. They can be as large as the length or width of the graphitic film itself, not just 2 or 3 times higher than the initial $L_a$ and $L_b$ of the original crystallites.

(8) Due to these unique chemical composition (including oxygen content), morphology, crystal structure (including inter-graphene spacing), and structural features (e.g. high degree of orientations, few defects, incomplete grain boundaries, chemical bonding and no gap between graphene sheets, and no interruptions in graphene planes), the highly oriented graphene oxide-derived graphitic film has a unique combination of outstanding thermal conductivity, electrical conductivity, mechanical strength, and stiffness (elastic modulus).

In conclusion, we have successfully developed an absolutely new, novel, unexpected, and patently distinct class of highly conducting and high-strength material: highly oriented graphene oxide-derived graphitic films. The chemical composition (oxygen content), structure (crystal perfection, grain size, defect population, etc), crystal orientation, morphology, process of production, and properties of this new class of materials are fundamentally different and patently distinct from flexible graphite foil, polymer-derived pyrolytic graphite, CVD-derived HOPG, and catalytic CVD graphene thin film. The thermal conductivity, electrical conductivity, elastic modulus, and flexural strength exhibited by the presently invented materials are much higher than what prior art flexible graphite sheets, paper of discrete graphene/GO/RGO platelets, or other graphitic materials could possibly achieve. These graphitic films have the best combination of excellent electrical conductivity, thermal conductivity, mechanical strength, and stiffness (modulus). These graphitic films can be used in a wide variety of thermal management applications. For instance, a graphitic film can be part of a thermal management device, such as a heat dissipation film used in a smart phone, tablet computer, flat-panel TV display, or other microelectronic or communications device.

We claim:

1. A process for producing a highly oriented graphene oxide film, said process comprising:
   (a) preparing either a graphene oxide dispersion having graphene oxide sheets dispersed in a fluid medium or a graphene oxide gel having graphene oxide molecules dissolved in a fluid medium, wherein said graphene oxide sheets or graphene oxide molecules contain an oxygen content higher than 5% by weight;
   (b) dispensing said graphene oxide dispersion or graphene oxide gel onto a gap between an applicator roller and a metering roller wherein a relative motion or rotation between said metering roller and said applicator roller generates an applicator layer of graphene oxide onto a surface of said application roller rotating in a first direction at a first line velocity, wherein said application roller transfers said applicator layer of graphene oxide to a surface of a supporting film driven in a second direction opposite to said first direction at a second line velocity, to form a wet layer of graphene oxide on said supporting film; and
   (c) at least partially removing said fluid medium from the wet layer of graphene oxide to form a dried layer of graphene oxide having all graphene oxide planes parallel to one another along the plane of the film and having an inter-planar spacing $d_{002}$ of 0.4 nm to 1.2 nm as determined by X-ray diffraction and an oxygen content no less than 5% by weight;
   wherein said process further comprised a step of aging said wet or dried layer of graphene oxide in an aging room at an aging temperature from 25° C. to 55° C. and humidity level from 20% to 99% for an aging time of 1 hour to 7 days to form an aged layer of graphene oxide.

2. The process of claim 1, wherein said supporting film is driven by a counter-rotating supporting roller disposed at a working distance from said application roller and rotating in said second direction opposite to said first direction.

3. The process of claim 1, wherein said step of dispensing said graphene oxide dispersion or graphene oxide gel onto said surface of the application roller includes using a metering roller and/or a doctor's blade to provide a desired thickness of said applicator layer of graphene oxide on said application roller surface.

4. The process of claim 1, wherein said process includes operating 2, 3, or 4 rollers.

5. The process of claim 1, wherein said process includes a reverse roll transfer coating procedure.

6. The process of claim 1, wherein said supporting film is fed from a feeder roller and said dried layer of graphene oxide supported by said supporting film is wound on a winding roller and said process is conducted in a roll-to-roll manner.

7. The process of claim 1, wherein the velocity ratio, defined as (said second line velocity)/(said first line velocity), is from 1/5 to 5/1.

8. The process of claim 7, wherein the velocity ratio is greater than 1/1 and less than 5/1.

9. The process of claim 1, wherein said fluid medium further contains pristine graphene sheets and a pristine graphene to graphene oxide ratio is from 1/100 to 100/1.

10. The process of claim 9, wherein said graphitic film has an electrical conductivity greater than 5,000 S/cm, a thermal conductivity from 800 W/mK to 1745 W/mK, a physical density greater than 1.9 g/cm3, a tensile strength greater than 80 MPa, and/or an elastic modulus greater than 60 GPa.

11. The process of claim 1, wherein said fluid medium consists of water and/or an alcohol.

12. The process of claim 1, wherein said graphene oxide sheets in said graphene oxide dispersion occupy a weight fraction of 0.1% to 25% based on the total weight of graphene oxide sheets and liquid medium combined.

13. The process of claim 12, wherein said graphene oxide sheets in said graphene oxide dispersion occupy a weight fraction of 0.5% to 15% based on the total weight of graphene oxide sheets and liquid medium combined.

14. The process of claim 12, wherein said graphene oxide sheets in said graphene oxide dispersion occupy a weight fraction of 3% to 15% based on the total weight of graphene oxide sheets and liquid medium combined.

15. The process of claim 1, wherein said graphene oxide dispersion or graphene oxide gel has greater than 3% by weight of graphene oxide dispersed in said fluid medium to form a liquid crystal phase.

16. The process of claim 1, wherein said graphene oxide dispersion or graphene oxide gel is prepared by immersing a graphitic material in a powder or fibrous form in an oxidizing liquid in a reaction vessel at a reaction temperature for a length of time sufficient to obtain said graphene oxide dispersion or said graphene oxide gel wherein said graphitic material is selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

17. The process of claim 1, further comprising a step of heat treating the dried layer of graphene oxide at a first heat treatment temperature higher than 55° C. but no greater than 2,200° C. for a desired length of time to produce a graphitic film having an inter-planar spacing $d_{002}$ less than 0.4 nm and an oxygen content less than 5% by weight.

18. The process of claim 17, further comprising a compression step, during or after said step (d), to reduce a thickness of said graphitic film.

19. The process of claim 17, wherein said graphitic film has a thickness from 100 μm to 500 μm.

20. The process of claim 17, wherein said first heat treatment temperature contains a temperature in the range of 500° C.-1,500° C. and the graphitic film has an oxygen content less than 1%, an inter-graphene spacing less than 0.345 nm, a thermal conductivity from 1,000 W/mK to 1,745 W/mK, and/or an electrical conductivity from 3,000 S/cm to 12,000 S/cm.

21. The process of claim 17, wherein said treatment temperature contains a temperature in the range of 1,500° C.-2,200° C. and the graphitic film has an oxygen content less than 0.01%, an inter-graphene spacing less than 0.337 nm, a thermal conductivity from 1,300 W/mK to 1,745 W/mK, and/or an electrical conductivity from 5,000 S/cm to 12,000 S/cm.

22. The process of claim 17, wherein said heat treatment temperature contains a temperature from 2,500° C. to 2,800° C. and the graphitic film has an oxygen content no greater than 0.001%, an inter-graphene spacing less than 0.336 nm, a mosaic spread value no greater than 0.7, a thermal conductivity from 1,500 W/mK to 1745 W/mK, and/or an electrical conductivity from 10,000 S/cm to 12,000 S/cm.

23. The process of claim 17, wherein said first heat treatment temperature contains a temperature from 2,500° C. to 2,800° C. and the graphitic film has an inter-graphene spacing less than 0.336 nm, a mosaic spread value no greater than 0.4, a thermal conductivity from 1,600 W/mK to 1745 W/mK, and/or an electrical conductivity from 10,000 S/cm to 12,000 S/cm.

24. The process of claim 17, wherein said graphene oxide dispersion or graphene oxide gel is obtained from a graphitic material having a maximum original graphite grain size and said graphitic film is a poly-crystal graphene structure having a grain size larger than said maximum original grain size.

25. The process of claim 17, wherein said graphene oxide dispersion or graphene oxide gel is obtained from a graphitic material having multiple graphite crystallites exhibiting no preferred crystalline orientation as determined by an X-ray diffraction or electron diffraction method and wherein said graphitic film is a single crystal or a poly-crystal graphene structure having a preferred crystalline orientation as determined by said X-ray diffraction or electron diffraction method.

26. The process of claim 17, wherein said step of heat-treating induces chemical linking, merging, or chemical bonding of graphene oxide sheets or graphene oxide molecules in an edge-to-edge manner.

27. The process of claim 17, further including a step of heat-treating the graphitic film at a second heat treatment temperature from 2,200° C. to 2,800° C. for a length of time sufficient for decreasing an inter-plane spacing $d_{002}$ to a value of from 0.3354 nm to 0.36 nm and decreasing the oxygen content to less than 2% by weight.

28. The process of claim 27, further comprising a compression step to reduce a thickness of said graphitic film during or after heat-treating said graphitic film at said second heat treatment temperature.

29. The process of claim 27, wherein the graphitic film exhibits an inter-graphene spacing less than 0.337 nm and a mosaic spread value less than 1.0.

30. The process of claim 27, wherein the graphitic film exhibits a degree of graphitization no less than 80% and/or a mosaic spread value less than 0.4.

31. The process of claim 27, wherein the graphitic film exhibits a degree of graphitization no less than 90% and/or a mosaic spread value no greater than 0.4.

32. The process of claim 27, wherein said graphitic film has an electrical conductivity greater than 8,000 S/cm, a thermal conductivity from 1,200 W/mK to 1,745 W/mK, a physical density greater than 2.0 g/cm3, a tensile strength greater than 100 MPa, and/or an elastic modulus greater than 80 GPa.

33. The process of claim 27, wherein said graphitic film has an electrical conductivity greater than 12,000 S/cm, a thermal conductivity from 1,500 W/mK to 1,745 W/mK, a physical density greater than 2.1 g/cm3, a tensile strength greater than 120 MPa, and/or an elastic modulus greater than 120 GPa.

\* \* \* \* \*